US012356072B2

(12) United States Patent
Byon et al.

(10) Patent No.: US 12,356,072 B2
(45) Date of Patent: Jul. 8, 2025

(54) CAMERA MODULE AND ELECTRONIC DEVICE INCLUDING THE SAME

(71) Applicant: Samsung Electronics Co., Ltd., Suwon-si (KR)

(72) Inventors: Kwangseok Byon, Suwon-si (KR); Bongchan Kim, Suwon-si (KR); Jaehyoung Park, Suwon-si (KR); Jonghoon Won, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 195 days.

(21) Appl. No.: 18/348,797

(22) Filed: Jul. 7, 2023

(65) Prior Publication Data

US 2024/0031677 A1    Jan. 25, 2024

Related U.S. Application Data

(63) Continuation of application No. PCT/KR2023/008177, filed on Jun. 14, 2023.

(30) Foreign Application Priority Data

Jul. 25, 2022  (KR) .................. 10-2022-0091913
Oct. 5, 2022   (KR) .................. 10-2022-0127059

(51) Int. Cl.
*H04N 23/68*   (2023.01)
*G03B 5/06*    (2021.01)
(Continued)

(52) U.S. Cl.
CPC ............. *H04N 23/687* (2023.01); *G03B 5/06* (2013.01); *H04N 23/54* (2023.01); *H04N 23/57* (2023.01);
(Continued)

(58) Field of Classification Search
None
See application file for complete search history.

(56) References Cited

U.S. PATENT DOCUMENTS 9,857,556 B1   1/2018  Kim et al.
11,388,322 B2  7/2022  Jeong et al.
(Continued)

FOREIGN PATENT DOCUMENTS

CN   111935386 A   *  11/2020
CN   114827408 A   *   7/2022   .......... H04M 1/0264
(Continued)

OTHER PUBLICATIONS

Search Report and Written Opinion dated Sep. 21, 2023 issued in International Patent Application No. PCT/KR2023/008177.

*Primary Examiner* — Paul M Berardesca
(74) *Attorney, Agent, or Firm* — Nixon & Vanderhye, P.C.

(57) ABSTRACT

A camera module according an embodiment includes: a lens assembly, an image sensor, an optical image stabilization (OIS) carrier configured to simultaneously rotate the lens assembly and the image sensor based on an axis perpendicular to an optical axis, a housing, a first OIS coil disposed to a first side surface of the OIS carrier, a second OIS coil disposed to a second side surface of the OIS carrier, a first OIS magnet disposed to face the first OIS coil, a second OIS magnet disposed to face the second OIS coil, a frame including a first portion disposed between the third side surface of the OIS carrier opposite the first side surface and the housing and including at least one first guide portion, and a second portion extending from the first portion and disposed between the fourth side surface of the OIS carrier opposite the second side surface and the housing, at least one first object disposed between the first portion and the third side surface, and at least one second object disposed (Continued)

between the second portion and the housing. The at least one first object may be configured to roll along the at least one first guide portion based on the OIS carrier rotating.

20 Claims, 22 Drawing Sheets

(51) Int. Cl.
*H04N 23/54* (2023.01)
*H04N 23/57* (2023.01)
*H04N 23/90* (2023.01)

(52) U.S. Cl.
CPC ..... *H04N 23/90* (2023.01); *G03B 2205/0023* (2013.01); *G03B 2205/0069* (2013.01)

(56) References Cited

U.S. PATENT DOCUMENTS

| | | |
|---|---|---|
| 11,595,581 B2 | 2/2023 | Chun et al. |
| 2021/0048730 A1 | 2/2021 | Jeong et al. |
| 2021/0215903 A1* | 7/2021 | Rho ................... G03B 13/36 |
| 2021/0215945 A1* | 7/2021 | Rho ................... G06F 1/1686 |
| 2021/0218866 A1* | 7/2021 | Moon ................. H04N 23/695 |
| 2021/0231967 A1* | 7/2021 | Yanagisawa ......... G02B 27/646 |
| 2021/0240003 A1* | 8/2021 | Sazai .................. G02B 27/646 |
| 2021/0266463 A1 | 8/2021 | Chun et al. |
| 2021/0318592 A1* | 10/2021 | Kim ..................... G03B 5/06 |
| 2022/0003958 A1* | 1/2022 | Jeong ..................... G02B 7/02 |
| 2022/0091476 A1 | 3/2022 | Minamisawa |
| 2022/0311916 A1 | 9/2022 | Rho et al. |
| 2023/0018968 A1 | 1/2023 | Byon et al. |
| 2023/0171497 A1 | 6/2023 | Song et al. |
| 2024/0337900 A1* | 10/2024 | An ..................... G03B 5/04 |

FOREIGN PATENT DOCUMENTS

| | | |
|---|---|---|
| KR | 20150058784 A | 5/2015 |
| KR | 20170019284 A | 2/2017 |
| KR | 10-2018-0127698 | 11/2018 |
| KR | 10-2009197 | 8/2019 |
| KR | 20200088729 A * | 7/2020 |
| KR | 10-2021-0101124 | 8/2021 |
| KR | 10-2021-0108202 | 9/2021 |
| KR | 10-2021-0115867 | 9/2021 |
| KR | 10-2021-0141896 | 11/2021 |
| KR | 20220015842 A | 2/2022 |

* cited by examiner

CAMERA MODULE AND ELECTRONIC DEVICE INCLUDING THE SAME

CROSS-REFERENCE TO RELATED APPLICATIONS

This application is a continuation of International Application No. PCT/KR2023/008177 designating the United States, filed on Jun. 14, 2023, in the Korean Intellectual Property Receiving Office and claiming priority to Korean Patent Application Nos. 10-2022-0091913, filed on Jul. 25, 2022, and 10-2022-0127059, filed on Oct. 5, 2022, in the Korean Intellectual Property Office, the disclosures of all of which are incorporated by reference herein in their entireties.

BACKGROUND

Field

The disclosure relates to a camera module and an electronic device including the same.

Description of Related Art

Recently, portable terminals such as tablet PCs and notebooks, as well as mobile phones such as smart phones, are equipped with high-performance micro-camera modules. As the portable terminal is miniaturized, an image quality may be deteriorated because a response to the shaking of hands increases during image capture. For example, the higher the magnification of a camera is, the greater the degree of shaking of an image is according to the shaking of the camera.

Therefore, in a camera function, a shake correction function is a function essential and important to obtain a clear picture. In general, as a shake correction method for an image stabilization function, there are optical image stabilization (OIS) and digital IS (DIS). As an optical shake correction method (e.g., OIS), there is a method of reducing shake by moving a lens or a sensor, and reducing shake by simultaneously rotating the lens and the sensor, and a digital shake correction method (e.g., DIS) is a method borrowed from the portable terminals and refers to a method of reducing shake by digital processing.

SUMMARY

According to an example embodiment, a camera module may include: a lens assembly including at least one lens aligned along an optical axis, an image sensor configured to convert light received through the at least one lens into an electrical signal, an optical image stabilization (OIS) carrier configured to tilt the lens assembly and the image sensor, a housing accommodating the lens assembly, the image sensor and the OIS carrier, a first OIS coil disposed to a first side of the OIS carrier, a second OIS coil disposed to a second side of the OIS carrier different with the first side, a first OIS magnet disposed to face the first OIS coil, a second OIS magnet disposed to face the second OIS coil, a frame including a first portion disposed between a third side of the OIS carrier opposite the first side and the housing and including at least one first guide portion, and a second portion extending from the first portion and disposed between a fourth side of the OIS carrier opposite the second side and the housing, at least one first object movably disposed between the first portion and the third side configured to enable movement of the OIS carrier, and at least one second object movably disposed between the second portion and the housing configured to enable movement of the frame and the OIS carrier. The at least one first object may be configured to move along the at least one first guide portion as the OIS carrier tilts.

An electronic device according to an example embodiment may include a first camera module. The first camera module may include: a lens assembly comprising at least one lens aligned along an optical axis, an image sensor configured to convert light received through the at least one lens into an electrical signal, an OIS carrier configured to tilt the lens assembly and the image sensor, a housing accommodating the lens assembly, the image sensor and the OIS carrier, a first OIS coil disposed to a first side of the OIS carrier, a second OIS coil disposed to a second side of the OIS carrier different with the first side, a first OIS magnet disposed to face the first OIS coil, a second OIS magnet disposed to face the second OIS coil, a frame including a first portion disposed between a third side of the OIS carrier opposite the first side and the housing and including at least one first guide portion, and a second portion extending from the first portion and disposed between a fourth side of the OIS carrier opposite the second side and the housing, at least one first object movably disposed between the first portion and the third side surface configured to enable movement of the OIS carrier, and at least one second object movably disposed between the second portion and the housing configured to enable movement of the frame and the OIS carrier. The at least one first object may be configured to move along the at least one first guide portion as the OIS carrier tilts.

BRIEF DESCRIPTION OF THE DRAWINGS

The above and other aspects, features and advantages of certain embodiments of the present disclosure will be more apparent from the following detailed description taken in conjunction with the accompanying drawings, in which.

In connection with the description of the drawings, the same or similar reference numerals may be used for the same or similar elements.

DETAILED DESCRIPTION

Figure 1:
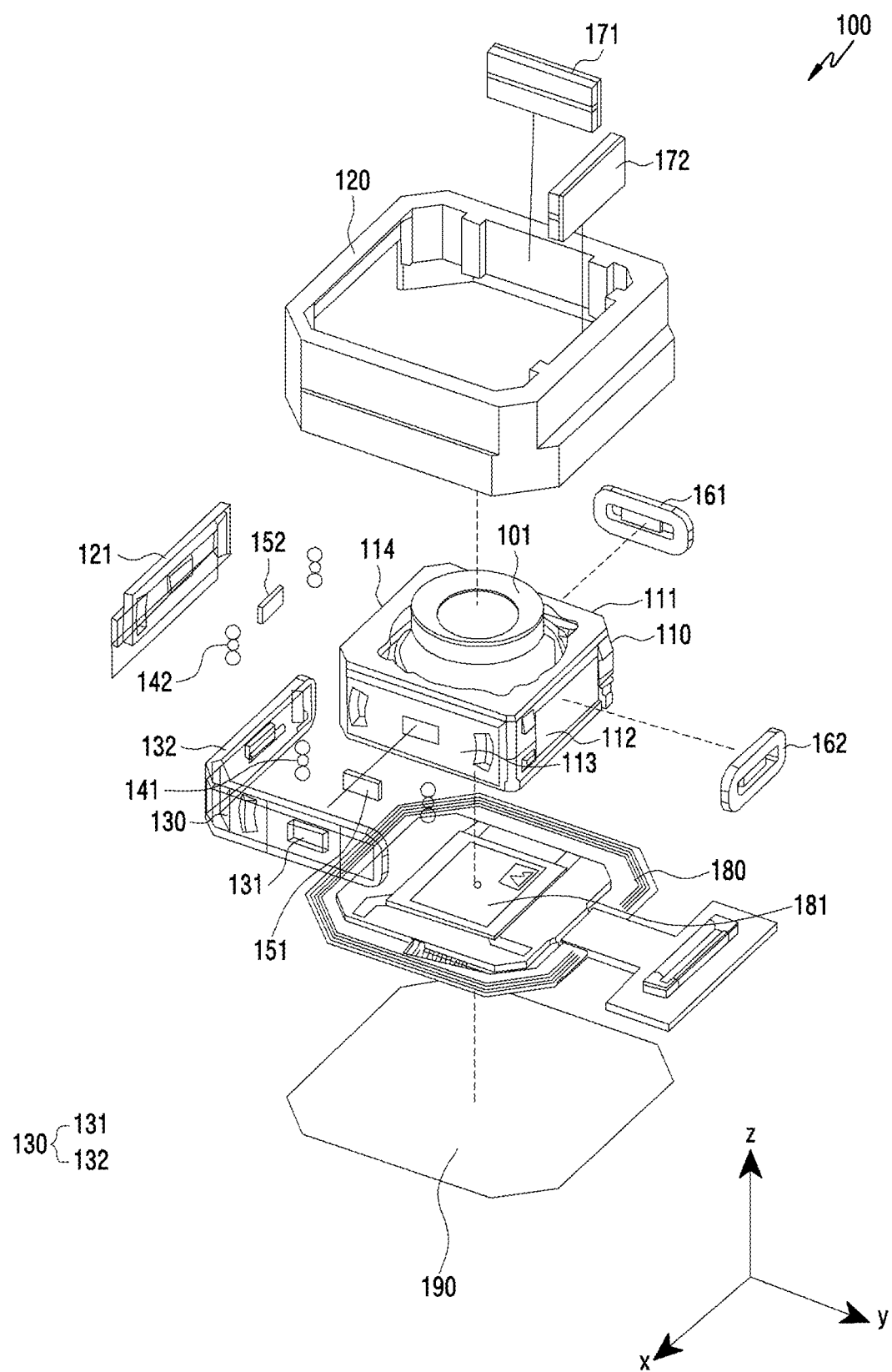
FIG. 1 is an exploded perspective view of a camera module according to various embodiments.

Hereinafter, various example embodiments of the present disclosure will be described with reference to the accompanying drawings. However, it should be understood that the present disclosure is not intended to limit the present disclosure to specific embodiments, and includes various modifications, equivalents, and/or alternatives of an embodiment of the present disclosure.

An electronic device of various embodiments of the present disclosure may include at least one of, for example, a smart phone, a tablet personal computer (PC), a mobile phone, a video phone, an e-book reader, a desktop personal computer, a laptop personal computer, a netbook computer, a workstation, a server, a personal digital assistant (PDA), a portable multimedia player (PMP), an MP3 player, a mobile medical device, a camera, or a wearable device. According to various embodiments, the wearable device may include at least one of an accessory type (e.g., watch, ring, bracelet, anklet, necklace, glasses, contact lens, or head-mounted-device (HMD)), a fabric or clothing integrated type (e.g., an electronic clothing), a body attachment type (e.g., a skin pad or tattoo), or a living body implantable type (e.g., an implantable circuit).

In various embodiments, the electronic device may be a home appliance. The home appliance may include at least one of, for example, a television set, a digital video disk (DVD) player, an audio system, a refrigerator, an air conditioner, a vacuum cleaner, an oven, a microwave oven, a washing machine, an air purifier, a set-top box, a home automation control panel, a security control panel, a TV box, a game console, an electronic dictionary, an electronic key, a camcorder, or an electronic picture frame.

In an embodiment, the electronic device may include at least one of various medical devices (e.g., various portable medical measuring devices (blood glucose meter, heart rate monitor, blood pressure monitor, or body temperature monitor), magnetic resonance angiography (MRA), magnetic resonance imaging (MRI), computer tomography (CT), camera, or ultrasonic device), a navigation device, a global navigation satellite system (GNSS), an event data recorder (EDR), a flight data recorder (FDR), an automotive infotainment device, marine electronic equipment (e.g., a marine navigation device or a gyrocompass), avionics, a security device, an automotive head unit, an industrial or domestic robot, an automatic teller's machine (ATM) in a financial institution, a point of sales (POS) of a shop, or Internet of things (e.g., light bulbs, various sensors, electricity or gas meters, sprinkler devices, smoke alarms, thermostats, street lights, toasters, exercise appliances, hot water tanks, heaters, or boilers).

According to various embodiments, the electronic device may include at least one of a part of furniture or building/structure, an electronic board, an electronic signature receiving device, a projector, or various measuring devices (e.g., water, electricity, gas, or radio wave measuring devices). In various embodiments, the electronic device may be one of the aforementioned various devices or a combination thereof. The electronic device of various embodiments may be a flexible electronic device. Also, the electronic device of an embodiment of the present disclosure is not limited to the aforementioned devices, and may include a new electronic device with technology development.

FIG. 1 is an exploded perspective view of a camera module 100 according to various embodiments.

According to an embodiment, at least one electronic device described above may include at least one camera module 100. For example, the at least one camera module may be disposed on a rear surface of a smart phone so as to face a rear of the smart phone. However, the disclosure is not limited thereto. It may be clearly understood by those skilled in the art that the camera module 100 of FIG. 1 may be applied to an electronic device equipped with a camera among various electronic devices or mobile devices.

Referring to FIG. 1, the camera module 100 of an embodiment may include a lens assembly 101, an optical image stabilization (OIS) carrier 110 accommodating at least a part of the lens assembly 101, a frame 130 surrounding at least a part of the OIS carrier 110, and a housing 120 accommodating the OIS carrier 110 and the frame 130. However, a construction of the camera module 100 is not limited thereto. The camera module 100 may add or omit at least one of the above-described components. For example, the camera module 100 may further include a printed circuit board 180 and/or a lower cover 190. In an example, the camera module 100 may further include an image sensor 181.

According to an embodiment, the lens assembly 101 may be disposed inside the OIS carrier 110. In an embodiment, the lens assembly 101 may include at least one lens. The at least one lens may be aligned along an optical axis. In one example, the lens may move forward and backward along an optical axis (e.g., Z axis), and may operate to clearly photograph a target object, which is a subject, by changing a focus position.

According to an embodiment, light information of a subject incident (or received) through the lens assembly 101 may be converted into an electrical signal by an image sensor 181 and be inputted to an image signal processor. However, the disclosure is not limited thereto.

According to an embodiment, the image sensor 181 may be disposed on an upper surface of the printed circuit board 180 (for example, a printed circuit board (PCB), a printed board assembly (PBA), a flexible PCB (FPCB), or a rigid-flexible PCB (RFPCB)). The image sensor 181 may be electrically connected to an image signal processor connected to the printed circuit board 180 through a connector. As the connector, a flexible printed circuit board (FPCB) or a cable, etc. may be used.

According to an embodiment, the image sensor 181 may include, for example, and without limitation, a complementary metal oxide semiconductor (CMOS) sensor or a charged coupled device (CCD) sensor, or the like. A plurality of individual pixels may be integrated in the image sensor 181, and each individual pixel may include a micro lens, a color filter, and a photodiode. Each individual pixel is a kind of photodetector, and may convert input light into an electrical signal. The photodetector may include a photodiode.

According to an embodiment, the OIS carrier 110 may accommodate at least a part of the lens assembly 101. For example, the OIS carrier 110 may surround the lens assembly 101. According to an embodiment, the OIS carrier 110 may include a first side surface 111, a third side surface 113 facing the first side surface 111, a second side surface 112 substantially perpendicular to the first side surface 111 and the third side surface 113, and a fourth side surface 114 substantially perpendicular to the first side surface 111 and the third side surface 113 and facing the second side surface 112. However, the disclosure is not limited thereto.

According to an embodiment, the OIS carrier 110 may include an opening through which a part of the lens assembly 101 may be exposed at a top center portion.

According to an embodiment, the OIS carrier 110 may include a first OIS coil 161 disposed on the first side surface 111 and a second OIS coil 162 disposed on the second side surface 112. The first OIS coil 161 may be disposed substantially perpendicular to the second OIS coil 162. In FIG. 1, it is illustrated that the OIS coil is disposed on the side surface of the OIS carrier 110, but the disclosure not limited thereto. For example, an OIS magnet may also be disposed on the side surface of the OIS carrier 110. In FIG. 1, it is illustrated that one OIS coil is disposed on each side surface of the OIS carrier 110, but the number of the OIS carriers 110 is not limited thereto.

According to an embodiment, the camera module 100 may include the housing 120 that mounts a barrel mounting at least one or more lens aligned on the optical axis, and at least one coil and/or magnet surrounding the barrel around the optical axis. For example, the camera module 100 may include a first OIS coil 161 disposed on a first side surface 111 of the OIS carrier 110, a second OIS coil 162 disposed on the second side 112 of the OIS carrier 110, a first OIS magnet 171 disposed to face the first OIS coil 161, and a second OIS magnet 172 disposed to face the second OIS coil 162. For example, referring to FIG. 1, the housing 120 may include a first OIS magnet 171 and a second OIS magnet 172 on an inner surface. However, the disclosure is not limited thereto. In another example, the housing 120 may also include the first OIS coil 161 and the second OIS coil 162 on an inner surface, and the OIS carrier 110 may include a first OIS magnet disposed to face the first OIS coil 161 and a second OIS magnet disposed to face the second OIS coil 162.

According to an embodiment, the housing 120 may accommodate at least a part of the OIS carrier 110. The housing 120 may be formed in a box shape having an inner space. For example, the housing 120 may be formed to surround at least a part of a side surface of the OIS carrier 110. However, the disclosure is not limited thereto. For example, at least a part of one side surface of the housing 120 may be open. According to an embodiment, the housing 120 may include a sub-housing 121 disposed on one side surface of which at least a part is open. In another example, the sub-housing 121 may also be formed integrally with the housing 120.

According to an embodiment, the first OIS magnet 171 may be disposed on an inner surface of the housing 120 facing the first OIS coil 161 disposed on the OIS carrier 110, and the second OIS magnet 172 may be disposed on an inner surface of the housing 120 facing the second OIS coil 162 disposed on the OIS carrier 110.

In an embodiment, the camera module 100 may perform a function of stabilization (e.g., OIS) of an image acquired by an image sensor (not shown), using the at least one coil and/or magnet included in the housing 120. For example, when at least one OIS coil interacts with at least one OIS magnet, the OIS carrier 110 may rotate the lens assembly 101 and the image sensor 181. For example, the OIS carrier 110 may rotate the lens assembly 101 and the image sensor 181 based on an axis perpendicular to an optical axis (e.g., an X axis or a Y axis). For example, the at least one coil may electromagnetically interact with each other under the control of a control circuit. For example, the camera module 100 may control an electromagnetic force by controlling a direction and/or strength of a current passing through the at least one coil, under the control of a processor. Using, for example, the Lorentz force due to the electromagnetic force, the camera module 100 may rotate at least a of the lens assembly 101 and the OIS carrier 110 including the lens assembly 101, about an axis substantially perpendicular to the optical axis (e.g., Z-axis), or move in a direction substantially perpendicular to the optical axis.

According to an embodiment, the housing 120 may include an opening through which a part of the lens assembly 101 may be exposed at a top center portion.

According to an embodiment, the camera module 100 may include at least one frame 130 disposed between the OIS carrier 110 and the housing 120. According to one embodiment, the frame 130 may be a member that guides the tilting of the OIS carrier 110 and the image sensor 181. In the present disclosure, the member that guides the tilting of the OIS carrier 110 and the image sensor 181 is referred to as a frame 130, but is not limited thereto. For example, the member for guiding the tilting may be referred to as a middle object or a tilting object. For example, since the member guiding the tilting is disposed between (or in the middle of) the housing 120 and the OIS carrier, it may be referred to as a middle object. However, the disclosure is not limited to this.

According to an embodiment, the at least one frame 130 may include a first portion 131 disposed between the third side 113 (e.g., the third side surface) of the OIS carrier 110 and the housing 120, and a second portion 132 disposed between the fourth side 114 (e.g., the fourth side surface) of the OIS carrier 110 and the housing 120. At least one of the first portion 131 or the second portion 132 may include at least one guide portion. The second portion 132 may extend from the first portion 131. In the present disclosure, the extension may include being formed of one member. The second portion 132 may be substantially perpendicular to the first portion 131. However, the disclosure is not limited thereto.

According to one embodiment, the camera module 100 may include at least one object for tilting the OIS carrier 110 and/or the frame 130. For example, the camera module 100 includes at least one first object 141 movably disposed between the first portion 131 and the third side 113, and at least one second object 142 movably disposed between the second portion 132 and the fourth side 114. In one example, at least one of the at least one first object 141 and the at least one second object 142 may include a ball. However, the disclosure is not limited to this. For example, the at least one first object a141 includes member allowing the OIS carrier 110 to be tilted between the frame 130 and the OIS carrier 110, and at least one second object 142 may include a member allowing the frame 130 and the OIS carrier 110 to be tilted between the frame 130 and the housing 120 (e.g., the sub-housing 121). In one example, at least one of the at least one first object 141 or the at least one second object 142 moves (e.g., slides or rolls) along at least one of a shaft or a rail), but may include a member capable of, but is not limited thereto.

According to an embodiment, the camera module 100 may include at least one first object 141 disposed between the first portion 131 and the third side surface 113, and at least one second object 142 disposed between the second portion 132 and the fourth side surface 114. The number and/or position of the at least one first object 141 and the at least one second object 142 shown in FIG. 1 is not limited to FIG. 1.

According to an embodiment, the at least one first object 141 may contact the OIS carrier 110. The at least one first object 141 may move (rotate) within a certain range on the OIS carrier 110.

According to an embodiment, the at least one first object 141 may reduce a friction accompanied between the OIS carrier 110 and the frame 130, by forming a point contact between the OIS carrier 110 and the first portion 131 of the frame 130. The above-described role may be performed by moving (rotating) the at least one first object 141 on the OIS carrier 110. The rotation of the at least one first object 141 and the movement of the OIS carrier 110 may occur together.

According to an embodiment, the at least one second object 142 may contact at least a part of the housing 120. For example, the at least one second object 142 may contact the sub-housing 121. The at least one second object 142 may also move (rotate) within a certain range on at least a part (for example, the sub-housing 121) of the housing 120.

According to an embodiment, the at least one second object 142 may reduce a friction accompanied between the housing 120 and the frame 130, by forming a point contact between the housing 120 (e.g., the sub-housing 121) and the second portion 132 of the frame 130. The above-described role may be performed by moving (rotating) the at least one second object 142 on the housing 120. The rotation of the at least one second object 142 and the movement of the OIS carrier 110 and/or the frame 130 may occur together.

According to an embodiment, the frame 130 may include at least one first magnet 151 disposed on the first portion 131, and at least one second magnet 152 disposed on the second portion 132.

According to an embodiment, the third side surface 113 may include at least one first yoke facing the at least one first magnet 151. According to an embodiment, an inner surface of the housing 120 (for example, the sub-housing 121) facing the second portion 132 may include at least one second yoke facing at least one second magnet 152.

According to an embodiment, the first magnet 151 may be disposed at a position corresponding to at least one yoke disposed on one side surface of the OIS carrier 110, thereby fixing the frame 130 inside the camera module 100. The second magnet 152 may be disposed at a position corresponding to at least one yoke disposed in the housing 120 (e.g., the sub-housing 121), thereby fixing the frame 130 inside the camera module 100. In the present disclosure, the magnet may refer, for example, to a magnet for adsorption. However, the disclosure is not limited thereto. For example, the magnet may comprise at least one of a member in attraction with the at least one yoke disposed on the OIS carrier 110, or a member in attraction with the at least one yoke disposed on the housing 120.

According to an embodiment, the at least one printed circuit board 180 may include a slit type printed circuit board. However, the disclosure is not limited thereto.

According to an embodiment, the camera module 100 of the present disclosure may reduce the difficulty of manufacturing, simplify assembly, and reduce performance deviation and secure reliability.

According to an embodiment, the camera module 100 may be applied with a module tilt OIS. In an example, the module tilt OIS may refer, for example the image sensor 181 and the OIS carrier tilting. However, the disclosure is not limited thereto.

Figure 2:
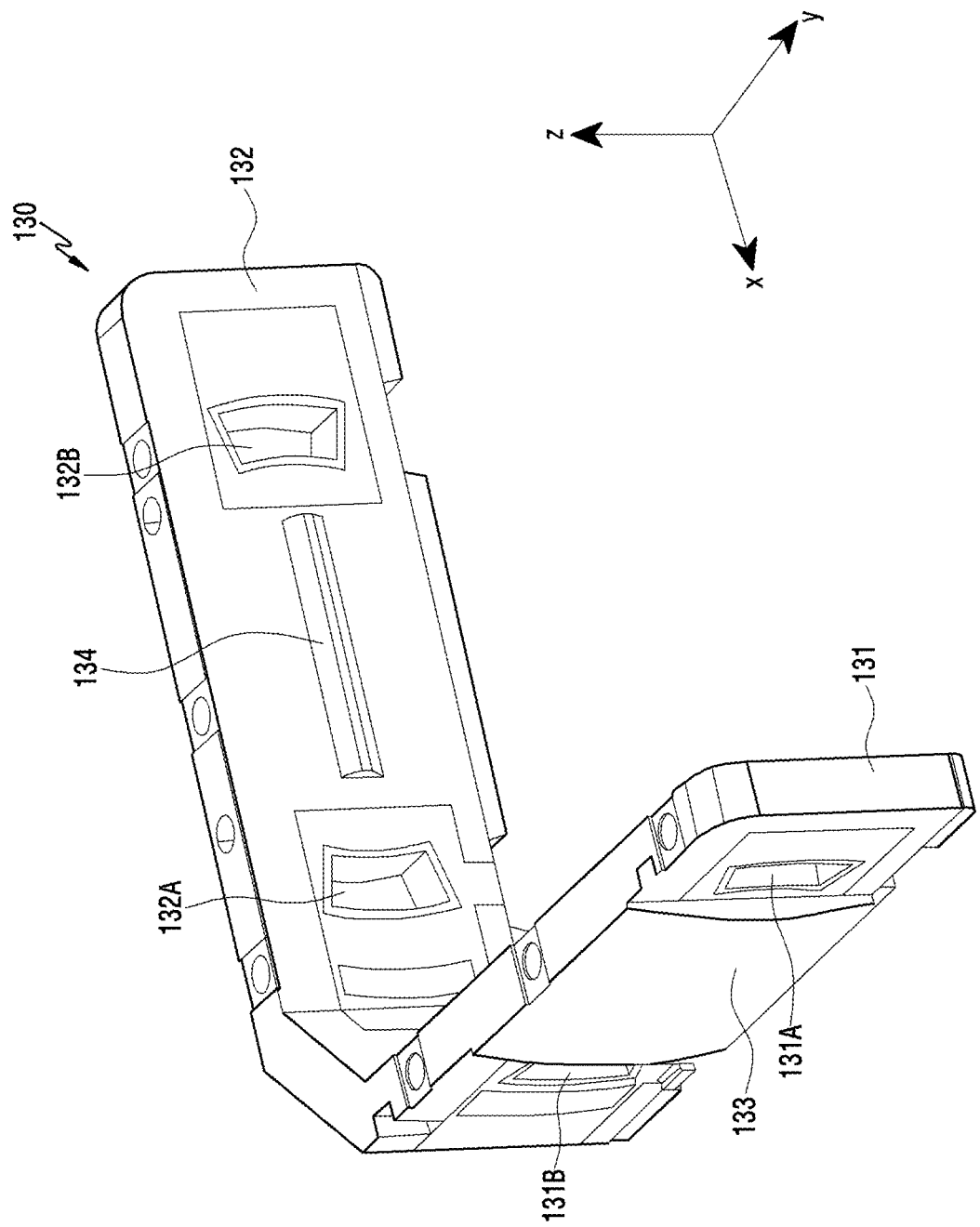
FIG. 2 is a perspective view illustrating a frame according to various embodiments.

FIG. 2 is a perspective view illustrating a frame 130 according to various embodiments.

The frame 130 of FIG. 2 may be referred by the frame 130 of FIG. 1. The same terms or the same reference numerals are used for the same or substantially the same components as those described above, and redundant information may not be repeated.

Referring to FIG. 2, the frame 130 may have a shape in which a plate is bent. For example, a first portion 131 of the frame 130 may be a plate having one direction (e.g., Y-axis direction) as a longitudinal direction. A second portion 132 may be a plate that extends from the first portion 131 and has a longitudinal direction (e.g., X-axis direction) substantially perpendicular to the longitudinal direction of the first portion 131. However, the disclosure is not limited thereto. In one example, the frame 130 has a first side substantially perpendicular to an axis substantially perpendicular to the optical axis (e.g., the X axis), and a second surface substantially perpendicular to another axis substantially perpendicular to the optical axis (e.g., the Y axis).

According to an embodiment, the first portion 131 may include a first accommodating portion 131A and a second accommodating portion 131B. The second accommodating portion 131B may be formed at a position that is spaced apart from the first accommodating portion 131A by a predetermined (e.g., specified) distance in the longitudinal direction of the first portion 131. In an example, at least one of the first accommodating portion 131A or the second accommodating portion 131B may include at least one of a groove, an opening, or a rail. However, the disclosure is not limited thereto. As used herein, a longitudinal direction may refer to the direction of a long side of a member. However, the disclosure is not limited thereto.

According to an embodiment, the first accommodating portion 131A and the second accommodating portion 131B may include shapes corresponding to a direction in which the OIS carrier (e.g., the OIS carrier 110 of FIG. 1) rotates. For example, the first accommodating portion 131A and the second accommodating portion 131B may include shapes curved in a direction facing each other. However, the disclosure is not limited thereto.

According to an embodiment, the first portion 131 may include a first curved portion 133 disposed between the first accommodating portion 131A and the second accommodating portion 131B. The first curved portion 133 may be disposed on an outer surface of the first portion 131. For example, the first curved portion 133 may be convexly formed on one surface of the frame 130 facing an inner surface of a housing (e.g., the housing 120 of FIG. 1). In an example, the first curved portion 133 may be a shape of protruding in a direction (e.g., +X direction) of directing from the third side surface 113 of the OIS carrier 110 toward the inner surface of the housing substantially parallel to the third side surface 113.

According to an embodiment, the first curved portion 133 may include a curved shape. For example, the first curved portion 133 may be formed seamlessly from a top edge of the first portion 131 toward a bottom edge of the first portion 131. However, the disclosure is not limited thereto. In one example, the first bent portion 133 may include a convex portion formed convexly in one direction (e.g., a direction toward the housing).

According to an embodiment, the second portion 132 may include a third accommodating portion 132A and a fourth accommodating portion 132B. The third accommodating portion 132A may be formed at a position that is spaced apart from the fourth accommodating portion 132B by a predetermined (e.g., specified) distance in a longitudinal direction of the second portion 132. In one example, at least one of the third accommodating portion 132A or the fourth accommodating portion 132B may include at least one of a groove, an opening, or a rail. However, the disclosure is not limited thereto.

According to an embodiment, the third accommodating portion 132A and the fourth accommodating portion 132B may include shapes corresponding to a direction in which the OIS carrier (e.g., the OIS carrier 110 of FIG. 1) and/or the frame 130 rotate. For example, the third accommodating portion 132A and the fourth accommodating portion 132B may include shapes curved in a direction facing each other. However, the disclosure is not limited thereto.

According to an embodiment, the second portion 132 may include a second curved portion 134 disposed between the third accommodating portion 132A and the fourth accommodating portion 132B. The second curved portion 134 may be disposed on an inner surface of the second portion 132. For example, the second curved portion 134 may be convexly formed on one side surface of the frame 130 facing a side surface of the OIS carrier 110. In an example, the second curved portion 134 may be a shape of protruding in a direction (e.g., +Y direction) opposite to a direction of directing from the fourth side surface 114 of the OIS carrier 110 to an inner surface of a housing (e.g., the inner surface of the sub-housing 121) substantially parallel to the fourth side surface 114.

According to an embodiment, the second curved portion 134 may include a curved shape. For example, the second curved portion 134 may be formed seamlessly from a top edge of the second curved portion 134 toward a bottom edge of the second curved portion 134. However, the disclosure is not limited thereto.

According to an embodiment, the second curved portion 134 may be disposed at a position that is spaced apart from a top edge of the second portion 132 and a bottom edge of the second portion 132 by a predetermined (e.g., specified) distance. However, the disclosure is not limited thereto.

According to an embodiment, the second curved portion 134 may be disposed in a longitudinal direction (e.g., X-axis direction) of the second portion 132 as a longitudinal direction. However, the disclosure is not limited thereto.

Figure 3:
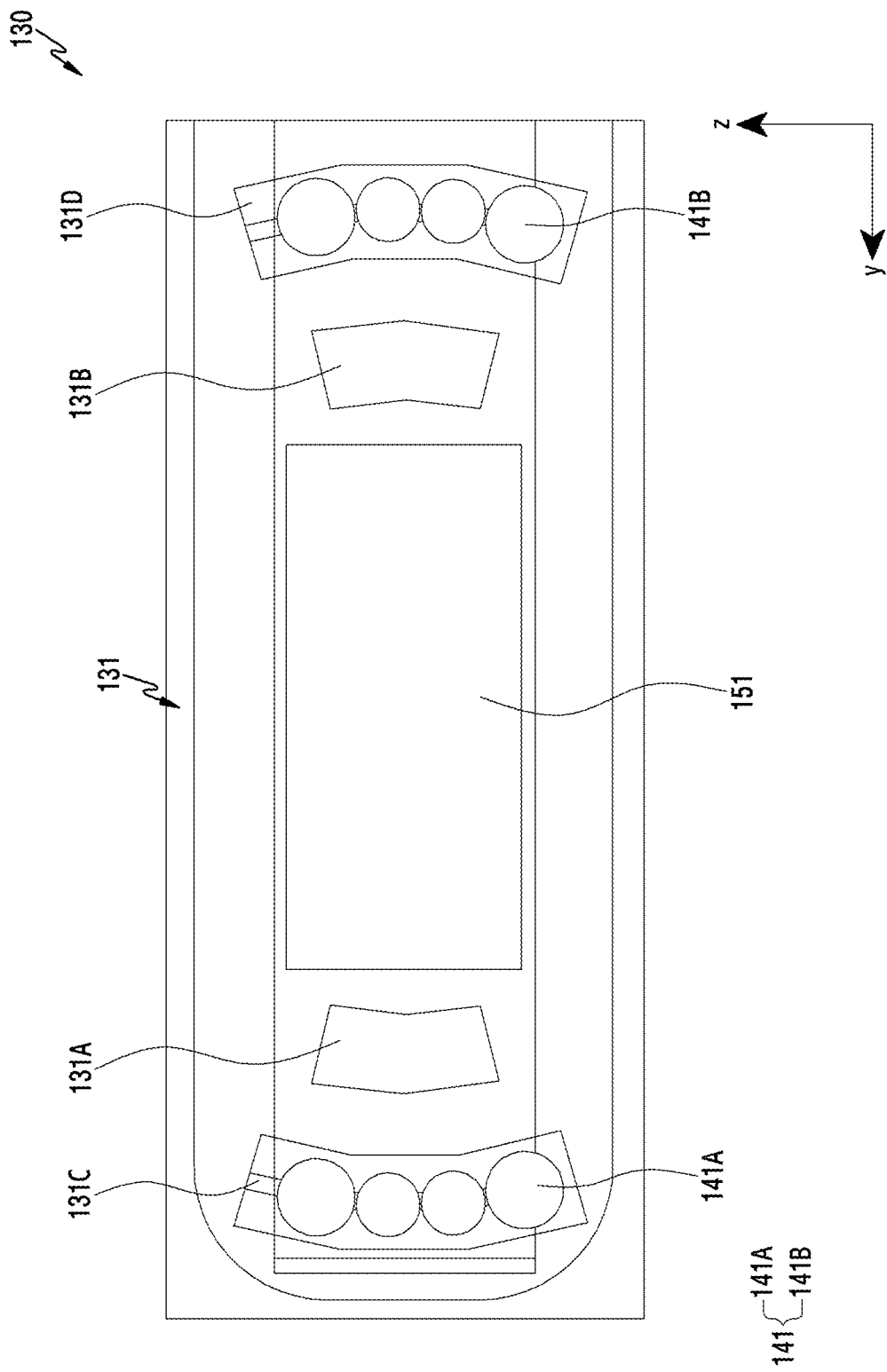
FIG. 3 is a diagram illustrating a first portion of a frame according to various embodiments.

FIG. 3 is a diagram illustrating a first portion 131 of a frame 130 according to various embodiments.

The frame 130 of FIG. 3 may be referred by the frame 130 of FIG. 1 and FIG. 2. The same terms or the same reference numerals are used for the same or substantially the same components as those described above, and redundant descriptions may not be repeated.

FIG. 3 may schematically illustrate an inner surface (e.g., a surface facing the −X direction of FIG. 2) of the first portion 131 of the frame 130. A construction of the frame 130 is not limited to FIG. 3. For example, the frame 130 may omit at least one of the components to be described later, or may further include at least one component.

Referring to FIG. 3, the frame 130 may include at least one guide portion accommodating at least one object 141. The at least one guide portion may be a portion that guides tilting of the OIS carrier 110 and the image sensor 181 relative to the housing (e.g., the housing 120 of FIG. 1). For example, the first portion 131 may include at least one of a first guide portion 131C or a second guide portion 131D guiding the OIS carrier 110 to be tilted relative to an axis substantially perpendicular to the optical axis (e.g., the X axis). For example, the second portion 132 includes a third guide portion (e.g., a third guide portion 132C of FIG. 6) and a fourth guide portion (e.g., a fourth guide portion 132D of FIG. 6) for guiding the OIS carrier 110 and the frame 130 to be tilted based on an axis substantially perpendicular to the optical axis (e.g., the Y axis). In an example, the axis substantially perpendicular to the optical axis (e.g., X axis or Y axis) may be referred to as a reference axis.

According to an embodiment, the first portion 131 may comprise at least one second guide portion 131D opposite the at least one first guide portion 131C with respect to a reference axis (e.g., the X-axis) along which the OIS carrier is tilted.

According to an embodiment, the second portion 132 may comprise at least one fourth guide portion (e.g., the fourth guide portion 132D in FIG. 6) opposite the at least one third guide portion (e.g., the third guide portion 132C in FIG. 6) with respect to a reference axis (e.g., the Y axis) along which the frame and the OIS carrier are tilted.

According to an embodiment, at least one guide portion (e.g., first guide portion 131C) can guide the OIS carrier 110 and image sensor 181 to tilt relative to a housing (e.g., housing 120 in FIG. 1). For example, the at least one guide portion may include at least one of a guide groove, an opening, a shaft, or a rail.

However, the disclosure is not a limitation. According to an embodiment, the first guide portion 131C may be formed at a position that is spaced apart by a predetermined (e.g., specified) distance from the second guide portion 131D in the longitudinal direction (e.g., Y-axis direction) of the first portion 131. In an example, the first accommodating portion 131A and the second accommodating portion 131B may be disposed between the first guide portion 131C and the second guide portion 131D. However, the disclosure is not limited thereto. In another example, the first guide portion 131C and the second guide portion 131D may be also disposed between the first accommodating portion 131A and the second accommodating portion 131B.

According to an embodiment, the first guide portion 131C and the second guide portion 131D may include shapes corresponding to a direction in which the OIS carrier (e.g., the OIS carrier 110 of FIG. 1) rotates. For example, the first guide portion 131C and the second guide portion 131D may include shapes curved in a direction facing each other. However, the disclosure is not limited thereto.

According to an embodiment, at least a portion of the at least one first object 141 may be disposed within at least one guide portion (e.g., first guide portion 131C and/or second guide portion 131D) to guide the OIS carrier (e.g., OIS carrier 110 of FIG. 1) to rotate along the at least one guide portion.

According to an embodiment, at least a part of the at least one first object 141 may be accommodated in at least one guide portion. For example, referring to FIG. 3, a plurality of first objects 141 may be disposed inside the guide portion in a longitudinal direction of the guide portion. However, the disclosure is not limited thereto.

According to an embodiment, the first object 141 may include a first group 141A disposed in the first guide portion 131C and including a plurality of first objects 141. In an example, at least some of the plurality of first objects 141 in the first group 141A may have different shapes and/or sizes. According to an embodiment, the first object 141 may include a second group 141B disposed in the second guide portion 131D and including a plurality of first objects 141. In an example, at least some of the plurality of first objects 141 in the second group 141B may have different shapes and/or sizes. However, the disclosure is not limited thereto.

According to an embodiment, at least one first object 141 may be at least partially accommodated in at least one guide portion and be guided along the guide portion (e.g., the inside of the guide groove). In the present disclosure, being guided may refer, for example, to an operation of being accommodated and moving, rotating, sliding or rolling in one area. However, the disclosure is not limited thereto.

According to an embodiment, the frame 130 may include a first magnet 151 disposed between the first guide portion 131C and the second guide portion 131D. The first magnet 151 may be disposed between the first accommodating portion 131A and the second accommodating portion 131B. In an example, the first magnet 151 may be disposed in a central portion of the first portion 131. However, the disclosure is not limited thereto. In FIG. 3, it is illustrated that the first magnet 151 is exposed from an inner surface of the first portion 131, but the disclosure not limited thereto. For example, the first magnet 151 may be disposed inside the first portion 131, so at least a part thereof may not be visible from the outside.

Although the second portion (e.g., the second portion 132 of FIG. 2) of the frame 130 is not shown in FIG. 3, a construction of the second portion, positions of the components, and/or the arrangement relationship of the components may be referred by the first portion 131.

Figure 4A:
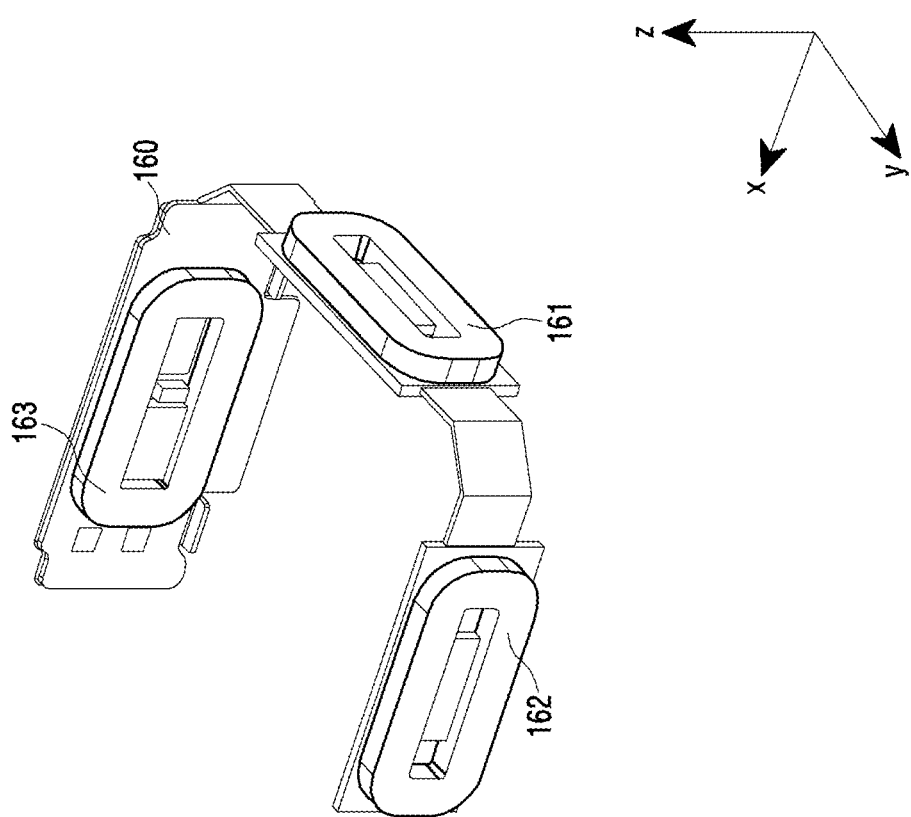
FIGS. 4A and 4B are perspective views illustrating a printed circuit board and an OIS carrier on which the printed circuit board is disposed according to various embodiments.
Figure 4B:
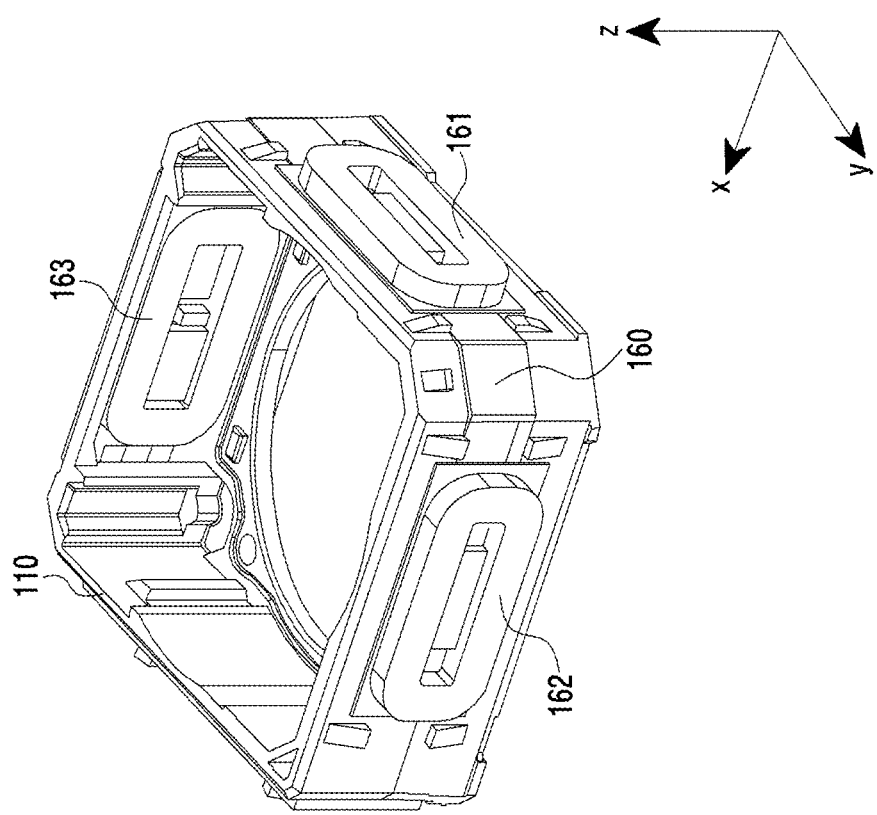

FIGS. 4A and 4B are perspective views illustrating a printed circuit board 160 and an OIS carrier 110 on which the printed circuit board 160 is disposed according to various embodiments.

FIG. 4A may be a perspective view of the printed circuit board 160, and FIG. 4B may be a perspective view of the OIS carrier 110 on which the printed circuit board 160 is disposed.

The OIS carrier 110 and at least one OIS coil (e.g., the first OIS coil 161) of FIG. 4 may be referred to as the OIS carrier 110 and at least one OIS coil of FIG. 1. The same terms or the same reference numerals are used for the same or substantially the same components as those described above, and redundant information may not be repeated.

According to an embodiment, at least one camera module (e.g., the camera module 100 of FIG. 1) may include at least one printed circuit board 160 surrounding at least a part of the OIS carrier 110. For example, the printed circuit board 160 may extend from a second side surface (e.g., the second side surface 112 of FIG. 1) of the OIS carrier 110 to a fourth side surface (e.g., the fourth side surface 114 of FIG. 1) along a first side surface (e.g., the first side surface 111 of FIG. 1).

According to an embodiment, at least one coil may be disposed on the printed circuit board 160. For example, referring to FIG. 4, the printed circuit board 160 may include a first OIS coil 161, a second OIS coil 162, and an AF coil 163. However, a construction of the printed circuit board 160 is not limited thereto. For example, the printed circuit board 160 may further include at least one coil, or may omit at least one of the aforementioned coils. According to an embodiment, the first OIS coil 161 and the second OIS coil 162 may be disposed on an outer surface of the printed circuit board 160, and the AF coil 163 may be disposed on an inner surface of the printed circuit board 160.

According to an embodiment, the first OIS coil 161 may be fixed to the portion of the printed circuit board 160 corresponding to the first side surface of the OIS carrier 110. The second OIS coil 162 may be fixed to the portion of the printed circuit board 160 corresponding to the second side surface of the OIS carrier 110. The AF coil 163 may be fixed to the portion of the printed circuit board 160 corresponding to the fourth side surface of the OIS carrier 110.

According to an embodiment, the at least one printed circuit board 160 may be electrically connected to at least one portion of the OIS carrier 110 and at least one portion of an AF carrier (not shown). When an electronic device including a camera module (e.g., the camera module 100 of FIG. 1) shakes, at least one processor included in the electronic device may provide an OIS control value to compensate for the shake of the electronic device. The electronic device may implement OIS by delivering an electrical signal corresponding to the OIS control value to an OIS driving coil (e.g., the first OIS coil 161 and/or the second OIS coil 162) disposed in the OIS carrier 110. At camera shooting, the at least one processor included in the electronic device may provide an AF control value to adjust a focal distance between a subject and a camera, and the electronic device may implement AF by delivering an electrical signal corresponding to the AF control value to an AF driving coil (e.g., the AF coil 163) disposed in the AF carrier.

Figure 5:
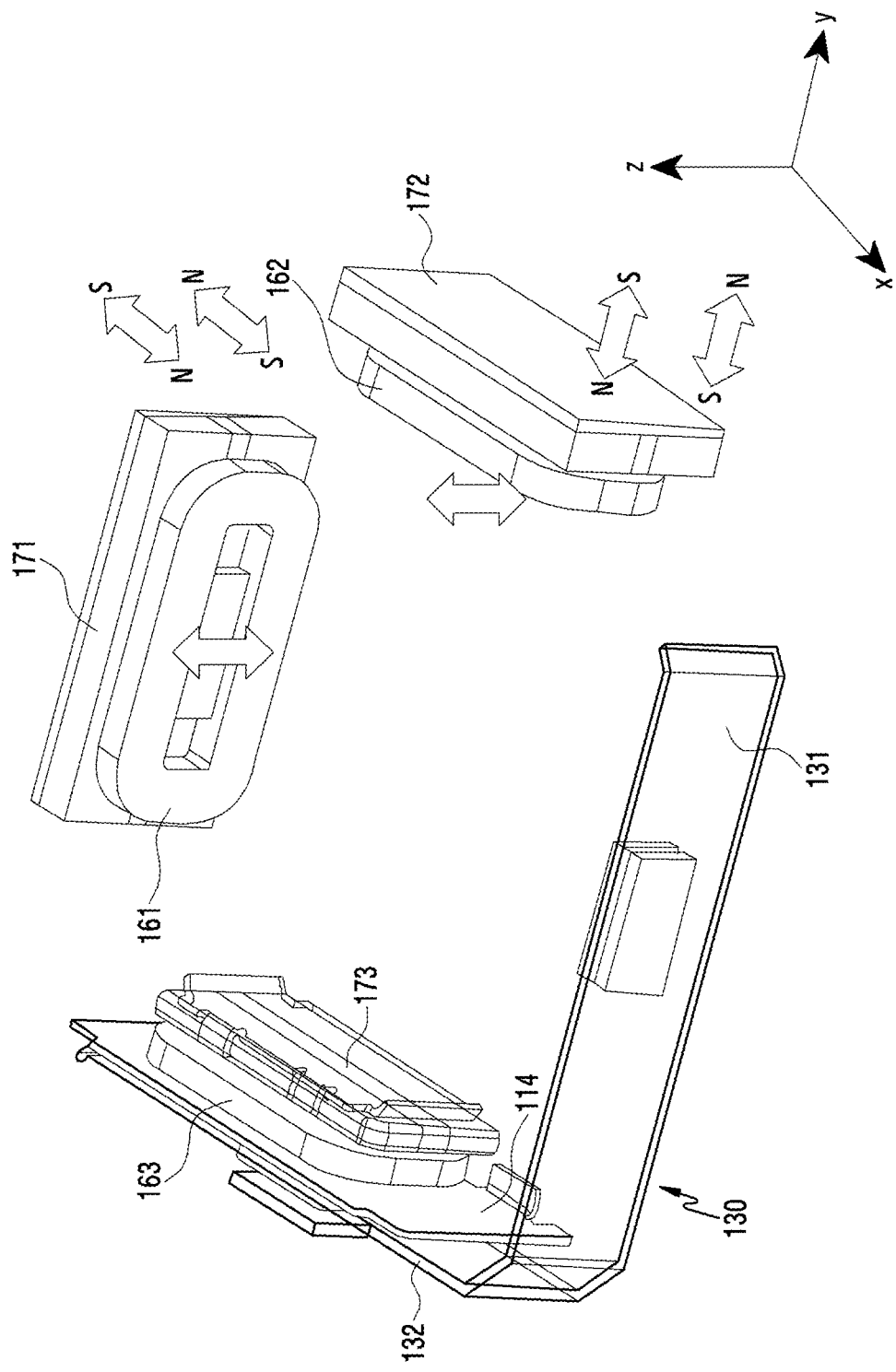
FIG. 5 is a perspective view illustrating positions of an OIS coil, an OIS magnet, and a frame in a camera module according to various embodiments.
Figure 6:
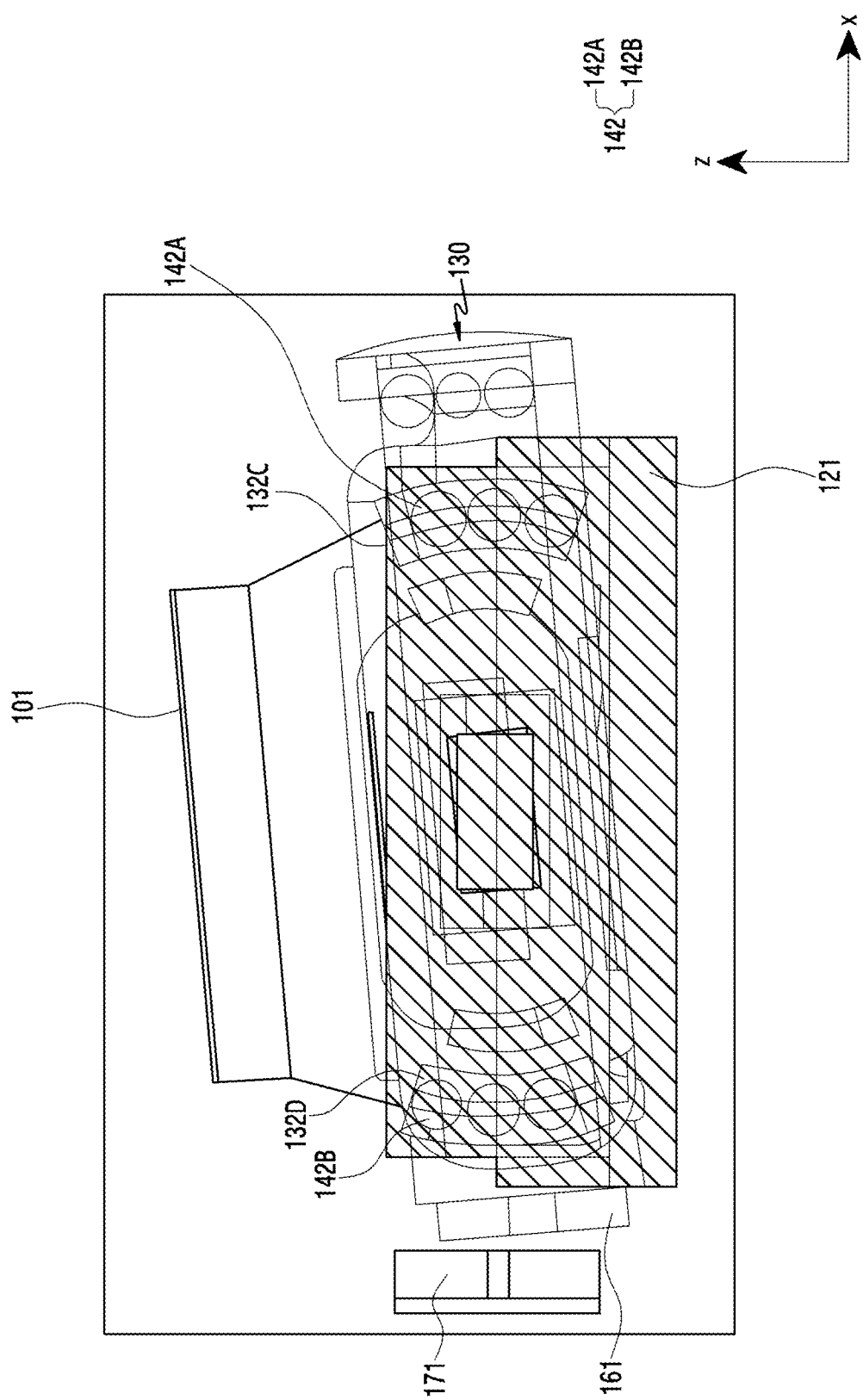
FIG. 6 is a diagram illustrating a transparent view illustrating rotation of an OIS carrier when a current is applied to a first OIS coil according to various embodiments.
Figure 7:
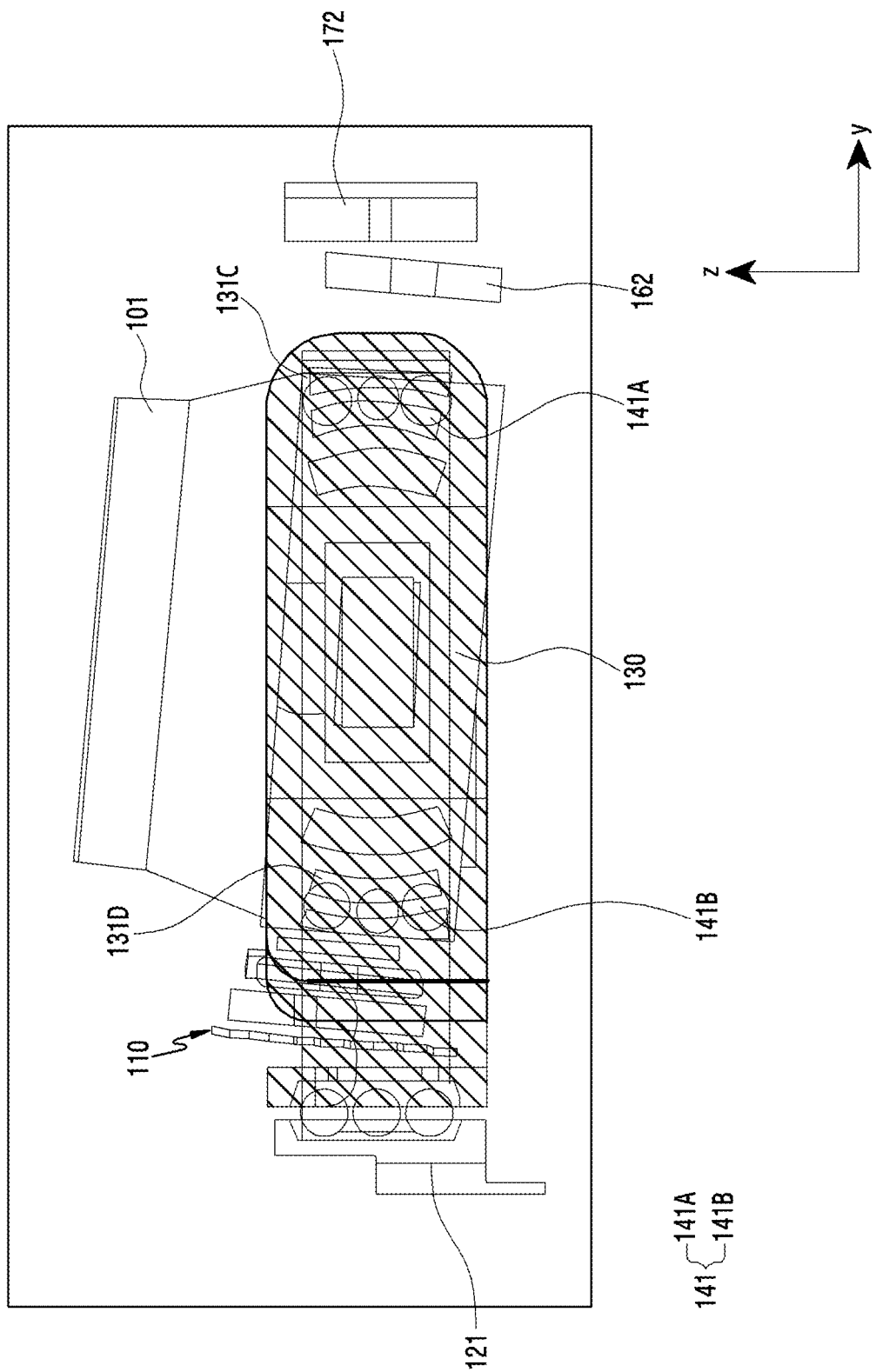
FIG. 7 is a diagram illustrating a transparent view illustrating rotation of an OIS carrier when a current is applied to a second OIS coil according to various embodiments.

FIG. 5 is a partial exploded perspective view illustrating positions of OIS coils 161 and 162, OIS magnets 171 and 172, and a frame 130 in a camera module according to various embodiments. FIG. 6 is a diagram illustrating a transparent view illustrating the rotation of an OIS carrier when a current is applied to the first OIS coil 161 according to various embodiments. FIG. 7 is a diagram illustrating a transparent view illustrating the rotation of an OIS carrier when a current is applied to the second OIS coil 162 according various embodiments.

The constructions of the camera modules of FIGS. 5, 6 and 7 may be referred by the constructions of the camera modules (e.g., the camera module 100 of FIG. 1) of FIG. 1 to FIG. 4. The same terms or the same reference numerals are used for the same or substantially the same components as those described above, and redundant descriptions may not be repeated.

Referring to FIG. 5, an OIS magnet for hand-shake correction (e.g., optical image stabilizer (OIS)) disposed in a housing of an embodiment may be operated in a pair with a coil disposed in an OIS carrier and related to hand-shake correction. In an embodiment, when a current is applied to the first OIS coil 161, the OIS carrier including a lens assembly (e.g., the lens assembly 101 of FIG. 6) may be rotated around a direction (e.g., Y-axis direction) substantially perpendicular to an optical axis (or around a direction substantially perpendicular to the optical axis as an axis). In an embodiment, when a current is applied to the second OIS coil 162, the OIS carrier including the lens assembly may be rotated around another direction (e.g., X-axis direction) substantially perpendicular to the optical axis (or around another direction substantially perpendicular to the optical axis as an axis) by an electromagnetic interaction between the second OIS coil 162 and the second OIS magnet 172.

According to an embodiment, the camera module may perform an auto focus (e.g., AF) control function in relation to an image acquired by an image sensor, using at least one coil 163 and/or magnet 173 included in the OIS carrier. For example, the at least one coil 163 may interact electromagnetically with each other under the control of a control circuit. For example, the camera module may control an electromagnetic force by controlling a direction and/or strength of a current passing through the at least one coil 163, under the control of a processor. The camera module may move at least a part of the lens assembly 101 and the AF carrier in an optical axis (e.g., Z-axis) direction, using the Lorentz force due to the electromagnetic force.

According to an embodiment, a structure for performing AF driving may be disposed in the OIS carrier 110. For example, the AF magnet 173 may be disposed in the AF carrier (not shown), and the AF coil 163 may be disposed in an AF housing (not shown). According to an embodiment, the AF housing may be fixed to the OIS carrier 110, and the AF carrier may be disposed on the lens assembly (e.g., the lens assembly 101 of FIG. 6). However, the disclosure is not limited thereto. According to an embodiment, the AF magnet 173 may operate in a pair with the AF coil 163. For example, when a current is applied to the AF coil 163, the lens assembly (e.g., the lens assembly 101 of FIG. 6) may move along a direction (e.g., Z-axis direction) parallel to the optical axis by an electromagnetic interaction between the AF coil 163 and the AF magnet 173.

According to an embodiment, the camera module may include at least one position sensor (not shown). For example, the position sensor may be a Hall sensor. According to an embodiment, the camera module (or a driving circuit included in the camera module) may measure a position of the lens assembly (101 in FIG. 6) and/or the OIS carrier accommodating the lens assembly using the at least one position sensor. For example, the camera module may measure a position on an X axis and/or a position on a Y axis of the lens assembly and/or the OIS carrier using the position sensor.

The embodiment of FIG. 6 may be an embodiment in which a current is applied to the first OIS coil 161. According to an embodiment, when the current is applied to the first OIS coil 161, a driving force may be provided in a direction (e.g., Z-axis direction) substantially parallel to the optical axis. When the driving force is provided, at least one second object 142 (142A, 142B) may move (or rotate) along guide portions 132C and 132D. As the at least one second object 142 moves (or rotates) along the guide portions 132C and 132D, the OIS carrier including the lens assembly 101 and the frame 130 may rotate around a direction (e.g., Y-axis direction) substantially perpendicular to the optical axis. According to an embodiment, as the at least one second object 142 moves (or rotates) along the guide portions 132C and 132D, the OIS carrier including the lens assembly 101 and the frame 130 may rotate around a direction (e.g., X-axis direction) substantially parallel to the optical axis with respect to a housing (e.g., the sub-housing 121) including at least one OIS magnet (e.g., the first OIS magnet 171).

According to an embodiment, at least a portion of the at least one second object 142 may be disposed within the at least one guide portion (e.g., guide portion 132C and/or guide portion 132D) to guide the OIS carrier (e.g., OIS carrier 110 of FIG. 1) and the frame 130 to rotate along the at least one guide portion.

The embodiment of FIG. 7 may be an embodiment in which a current is applied to the second OIS coil 162. According to an embodiment, when the current is applied to the second OIS coil 162, a driving force may be provided in a direction (e.g., Z-axis direction) substantially parallel to the optical axis. When the driving force is provided, at least one first object 141 (141A, 141B) may move (or rotate) along guide portions 131C and 131D. As the at least one first object 141 moves (or rotates) along the guide portions 131C and 131D, the OIS carrier including the lens assembly 101 may rotate around another direction (e.g., Y-axis direction) substantially perpendicular to the optical axis. According to an embodiment, as the at least one first object 141 moves (or rotates) along the guide portions 131C and 131D, the OIS carrier including the lens assembly 101 may rotate around another direction (e.g., Y-axial direction) substantially parallel to the optical axis with respect to a housing (e.g., the housing 120 of FIG. 1) including at least one OIS magnet (e.g., the second OIS magnet 172) and the frame 130.

Figure 8:
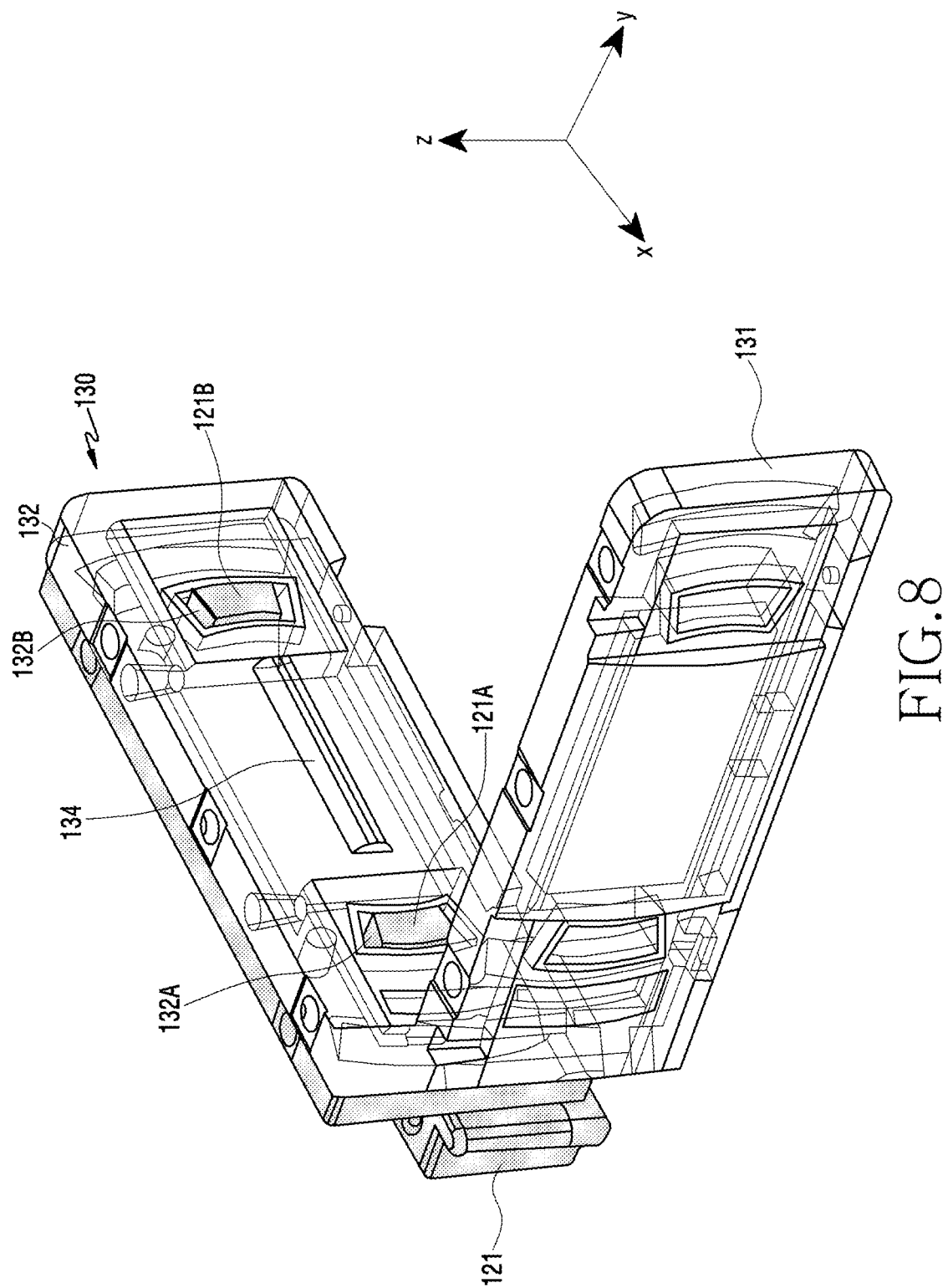
FIG. 8 is a transparent perspective view illustrating a sub-housing and a frame according to various embodiments.

FIG. 8 is a transparent perspective view illustrating a sub-housing 121 and a frame 130 according to various embodiments.

The sub-housing 121 and the frame 130 of FIG. 8 may be referred to as the sub-housing 121 and the frame 130 of FIGS. 1 to 7. The same terms or the same reference numerals are used for the same or substantially the same components as those described above, and redundant descriptions may not be repeated.

The frame 130 of an embodiment may include a third accommodating portion 132A and a fourth accommodating portion 132B in a second portion 132.

According to an embodiment, the housing (e.g., the sub-housing 121) may include at least one protrusion accommodated in at least one accommodating portion of the frame 130. For example, referring to FIG. 8, the sub-housing 121 may include a first protrusion 121A and a second protrusion 121B, which protrude in a direction (e.g., +Y-axis direction) of being toward the frame 130, on a surface facing the frame 130. In a state where the second portion 132 of the frame 130 is disposed to face the sub-housing 120, the first protrusion 121A may be accommodated in the third accommodating portion 132A. The second protrusion 121B may be accommodated in the fourth accommodating portion 132B. In FIG. 8, it is illustrated that the sub-housing 121 includes two protrusions, but the number of protrusions is not limited thereto.

According to an embodiment, a shape of at least one protrusion (e.g., the first protrusion 121A and the second protrusion 121B) may be formed to correspond to a shape of at least one accommodating portion (e.g., the third accommodating portion 132A and the fourth accommodating portion 132B).

According to an embodiment, the first protrusion 121A and the second protrusion 121B may include shapes corresponding to a rotation direction of the OIS carrier (e.g., the OIS carrier 110 of FIG. 1). For example, the first protrusion 121A and the second protrusion 121B may include shapes curved in a direction of facing each other. However, the disclosure is not limited thereto.

According to an embodiment, the at least one protrusion may be guided along the accommodating portion while being accommodated in the at least one accommodating portion. For example, when the OIS carrier (e.g., the OIS carrier 110 of FIG. 1) rotates, the first protrusion 121A may move in a first direction inside the third accommodating portion 132A, and the second protrusion 121B may move in a direction opposite to the first direction inside the fourth accommodating portion 132B.

According to an embodiment, when an external shock is applied to an electronic device, the first protrusion 121A and/or the second protrusion 121B may perform a role of preventing and/or reducing the frame 130 from being separated from the housing. According to an embodiment, when the OIS carrier rotates, the first protrusion 121A and/or the second protrusion 121B may perform a role of limiting an amount of rotation of the OIS carrier.

According to an embodiment, in FIG. 8, it is illustrated that the sub-housing 121 includes at least one protrusion, and the second portion 132 includes at least one accommodating portion, but it is not limited thereto. For example, the sub-housing 121 may include at least one accommodating portion, and the second portion 132 may include at least one protrusion.

Figure 9:
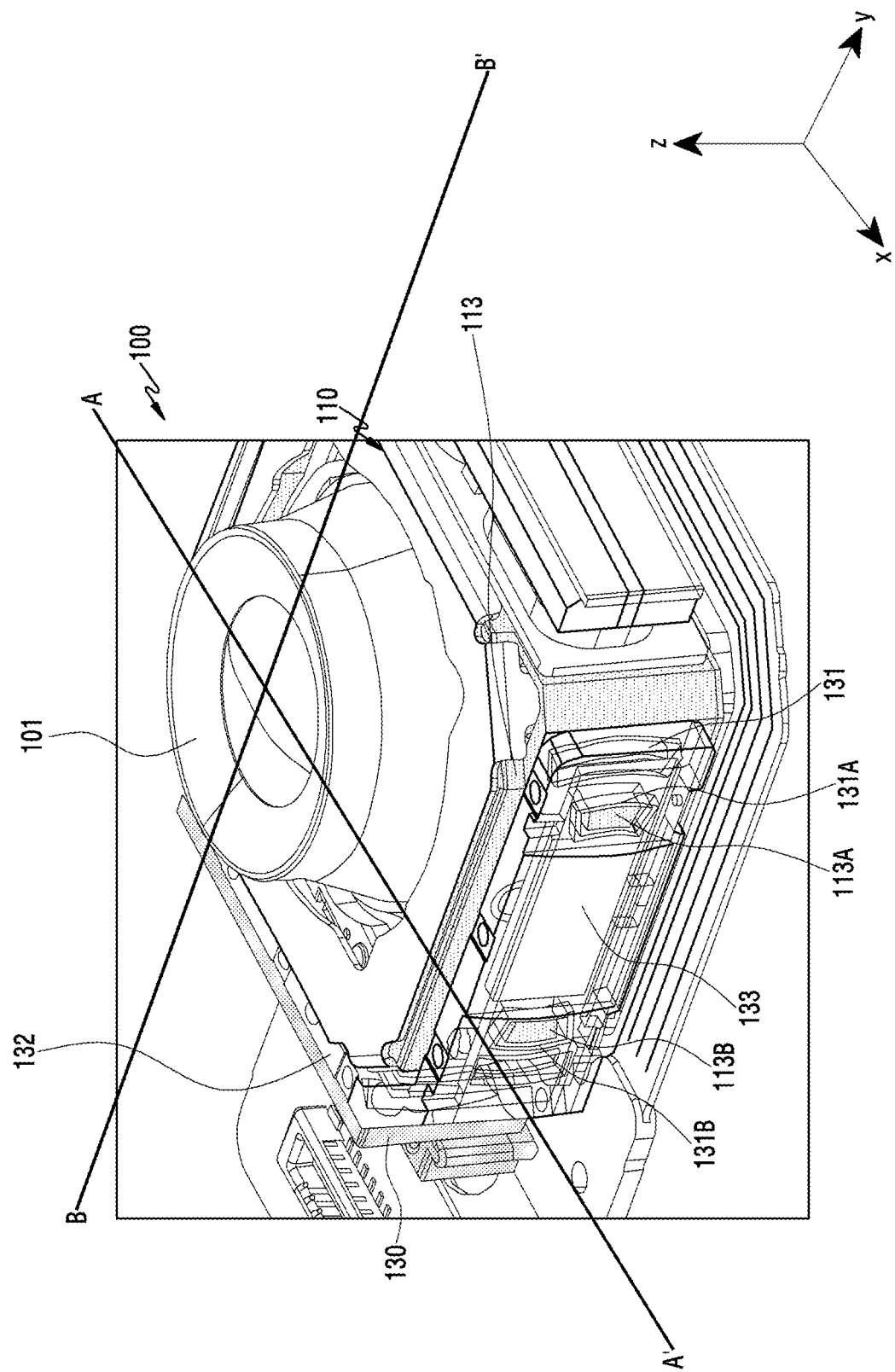
FIG. 9 is a partial perspective view illustrating a camera module according to various embodiments.

FIG. 9 is a partial perspective view illustrating a camera module 100 according to various embodiments.

The camera module 100 of FIG. 9 may be referred by the camera modules of FIGS. 1 to 8. The same terms or the same reference numerals are used for the same or substantially the same components as those described above, and redundant descriptions may not be repeated.

A frame 130 of an embodiment may include a first accommodating portion 131A and a second accommodating portion 131B in a first portion 131.

According to an embodiment, an OIS carrier 110 may include at least one protrusion accommodated in at least one accommodating portion of the frame 130. For example, referring to FIG. 9, the OIS carrier 110 may include a third protrusion 113A and a fourth protrusion 113B, which protrude in a direction (e.g., +X-axis direction) of facing the first portion 131 of the frame 130, on a surface (e.g., a third side surface 113) facing the first portion 131 of the frame 130. In a state where the first portion 131 of the frame 130 is disposed to face the OIS carrier 110 (e.g., the third side surface 113), the third protrusion 113A may be accommodated in the first accommodating portion 131A. The fourth protrusion 113B may be accommodated in the second accommodating portion 131B. In FIG. 9, it is illustrated that the OIS carrier 110 includes two protrusions, but the number of protrusions is not limited thereto.

According to an embodiment, a shape of at least one protrusion (e.g., the third protrusion 113A and the fourth protrusion 113B) may be formed to correspond to a shape of at least one accommodating portion (e.g., the first accommodating portion 131A and the second accommodating portion 131B). According to an embodiment, the third protrusion 113A and the fourth protrusion 113B may include shapes corresponding to a direction in which the OIS carrier 110 rotates. For example, the third protrusion 113A and the fourth protrusion 113B may include shapes curved in a direction of facing each other. However, the disclosure is not limited thereto.

According to an embodiment, the at least one protrusion may be guided along the accommodating portion while being accommodated in the at least one accommodating portion. For example, when the OIS carrier 110 rotates, the third protrusion 113A may move within the first accommodating portion 131A in a second direction, and the fourth protrusion 113B may move within the second accommodating portion 131B in a direction opposite to the second direction.

According to an embodiment, when an external shock is applied to the electronic device, the third protrusion 113A and/or the fourth protrusion 113B may perform a role of preventing and/or reducing the frame 130 from being separated from the OIS carrier. According to an embodiment, when the OIS carrier rotates, the third protrusion 113A and/or the fourth protrusion 113B may perform a role of limiting the amount of rotation of the OIS carrier.

According to an embodiment, in FIG. 9, it is illustrated that the OIS carrier includes at least one protrusion, and the first portion 131 includes at least one accommodating portion, but the disclosure is not limited thereto. For example, the OIS carrier may include at least one accommodating portion, and the first portion 131 may include at least one protrusion.

Figure 10:
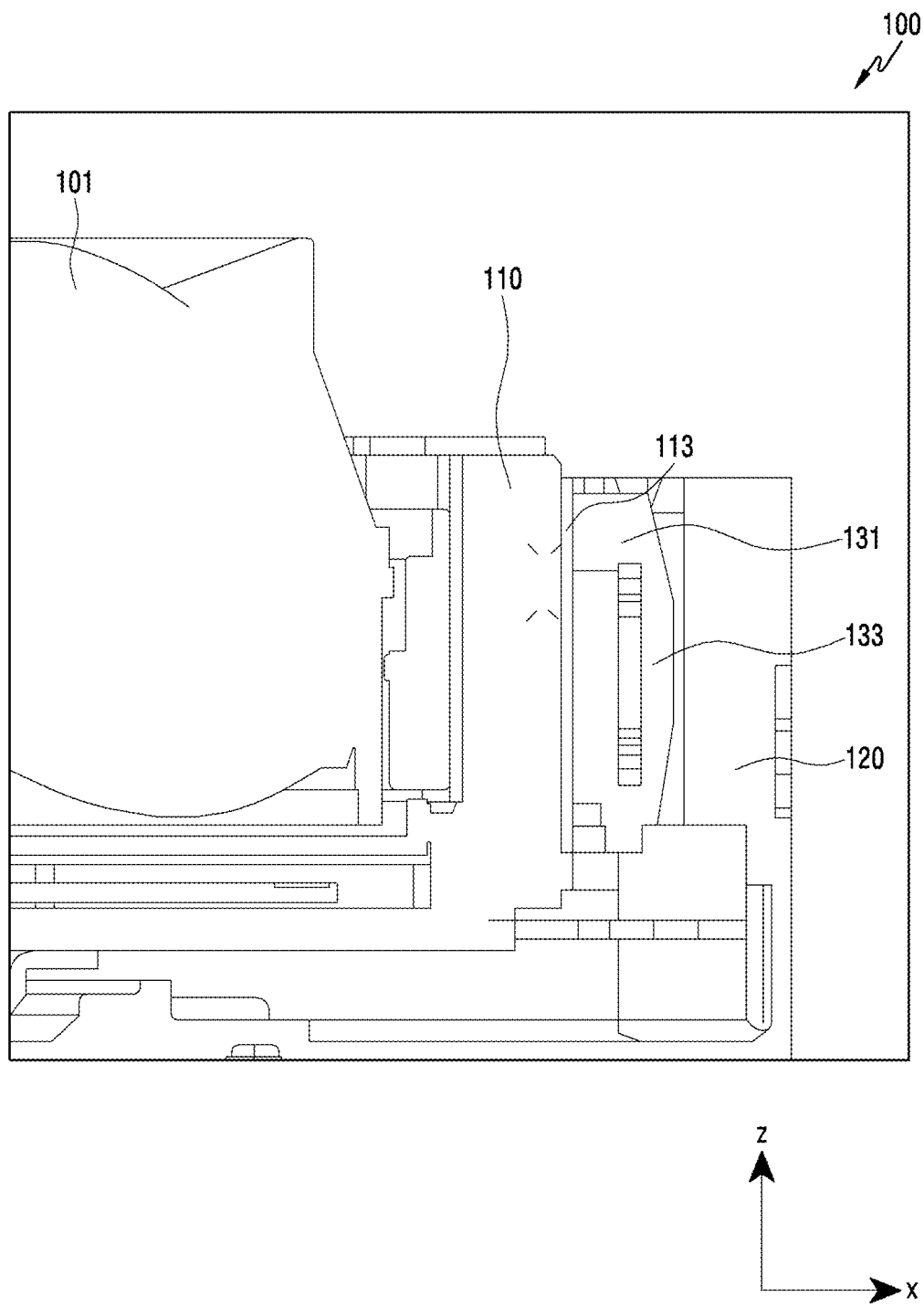
FIG. 10 is a cross-sectional view of a camera module according to various embodiments.

FIG. 10 is a cross-sectional view of a camera module 100 according to various embodiments.

FIG. 10 may be a cross-sectional view of the camera module 100 of FIG. 9 taken along line A-A'.

The camera module 100 of FIG. 10 may be referred by the camera modules of FIGS. 1 to 9. The same terms or the same reference numerals are used for the same or substantially the same components as those described above, and redundant descriptions may not be repeated.

Referring to FIG. 10, a first portion 131 of a frame may include at least one first curved portion 133 protruding toward an inner surface of a housing 120 facing the first portion 131.

According to an embodiment, the at least one first curved portion 133 may be configured to be equal to or smaller than a reference radius of a Y-axis rotation axis of the OIS carrier 110. Therefore, when the OIS carrier 110 rotates, an air gap between the first portion 131 and the housing 120 is maintained (or when the OIS carrier 110 rotates, a gap between the first portion 131 and the housing 120 is kept constant), whereby when the OIS carrier 110 rotates, the frame 130 may not collide with the housing 120 or may not cause a friction with an inner surface of the housing 120. However, the disclosure is not limited thereto.

According to an embodiment, the first portion 131 includes at least one curved portion 133, whereby at least one first object may be prevented and/or reduced from being separated due to an external shock applied to the electronic device.

Figure 11:
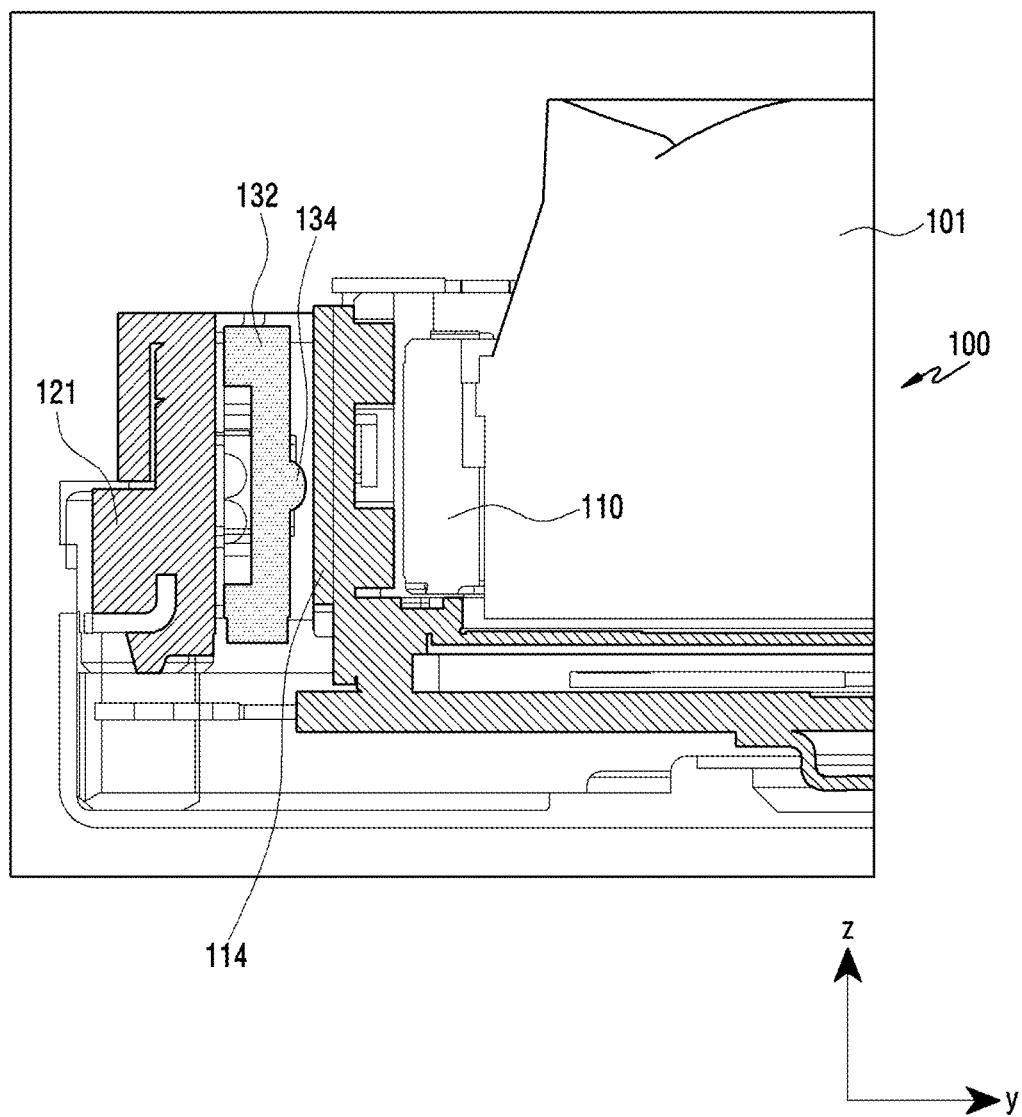
FIG. 11 is a cross-sectional view of a camera module according to various embodiments.

FIG. 11 is a cross-sectional view of a camera module according to various embodiments.

FIG. 11 may be a cross-sectional view of the camera module 100 of FIG. 9 taken along line B-B'.

The camera module 100 of FIG. 11 may be referred by the camera modules of FIGS. 1 to 10. The same terms or the same reference numerals are used for the same or substantially the same components as those described above, and redundant descriptions may not be repeated.

Referring to FIG. 11, a second portion 132 of a frame may include at least one second curved portion 134 protruding toward an outer surface of an OIS carrier 110 facing the second portion 132. In an embodiment, the second portion 132 may include at least one second curved portion 134 protruding toward a fourth side surface 114 of the OIS carrier 110.

According to an embodiment, the second portion 132 includes the at least one curved portion 134, whereby at least one second object may be prevented and/or reduced from being separated due to an external shock applied to the electronic device.

Figure 12:
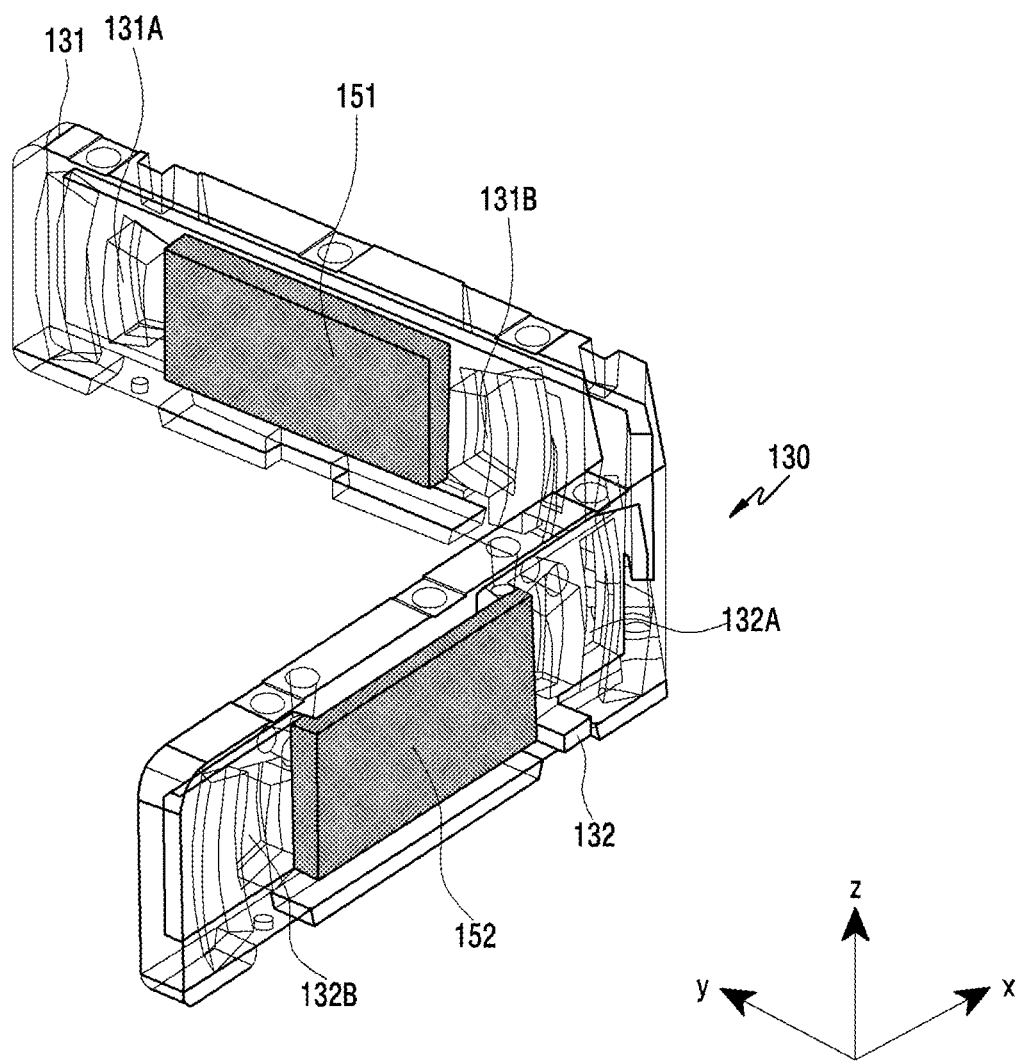
FIG. 12 is a transparent perspective view illustrating a frame including a magnet according to various embodiments.

FIG. 12 is a partial transparent perspective view illustrating a frame 130 including at least one magnet 151 or 152 according to various embodiments.

The frame 130 of FIG. 12 may be referred by the frames of FIGS. 1 to 11. The same terms or the same reference numerals are used for the same or substantially the same components as those described above, and redundant descriptions may not be repeated.

Referring to FIG. 12, a first portion 131 of the frame 130 may include at least one first magnet 151. A second portion 132 of the frame 130 may include at least one second magnet 152.

According to an embodiment, a length of the first magnet 151 in a longitudinal direction (e.g., Y-axis direction) may be equal to or smaller than a distance from a first accommodating portion 131A to a second accommodating portion 131B. However, the disclosure is not limited thereto.

According to an embodiment, a width of a direction (e.g., Z-axis direction) perpendicular to the longitudinal direction of the first magnet 151 may be equal to or less than a width of a direction perpendicular to the longitudinal direction of the first magnet 151 of the first portion 131. However, the disclosure is not limited thereto.

According to an embodiment, a length of the second magnet 152 in a longitudinal direction (e.g., X-axis direction) may be equal to or less than a distance from a third accommodating portion 132A to a fourth accommodating portion 132B. However, the disclosure is not limited thereto.

According to an embodiment, a width of a direction perpendicular to the longitudinal direction (e.g., Z-axis direction) of the second magnet 152 may be equal to or smaller than a width of a direction perpendicular to the longitudinal direction of the second magnet 152 of the second portion 132. However, the disclosure is not limited thereto.

According to an embodiment, as a size of the first magnet 151 or the second magnet 152 increases, it may efficiently control the movement of an OIS carrier, when the electronic device receives an external shock.

Figure 13A:
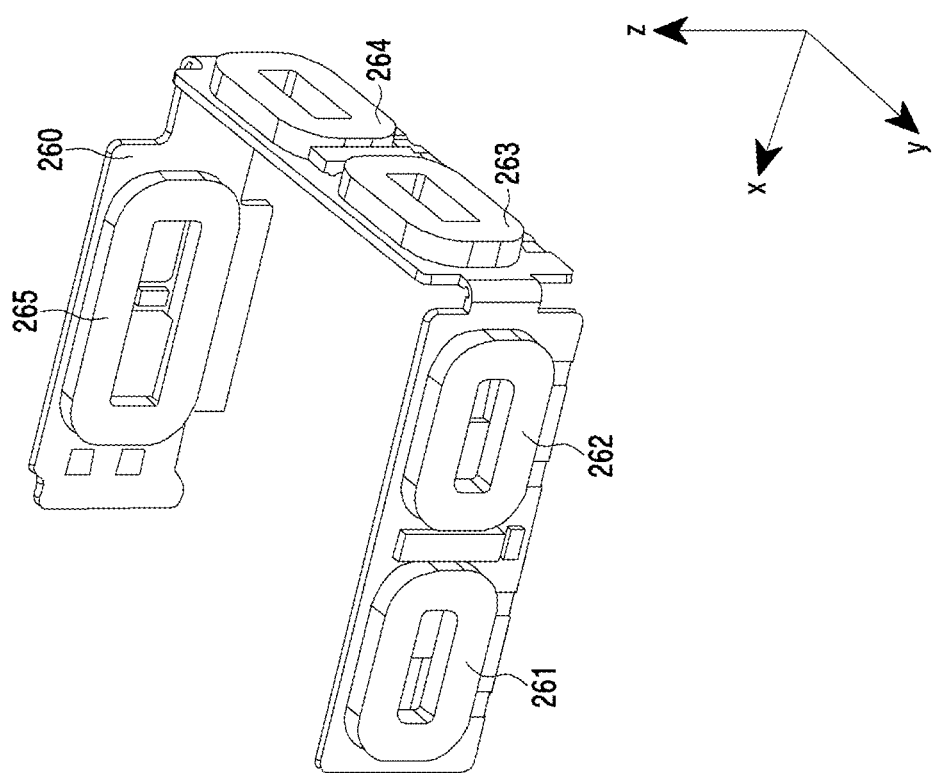
FIGS. 13A and 13B are perspective views illustrating a printed circuit board and an OIS carrier on which the printed circuit board is disposed according to various embodiments.
Figure 13B:
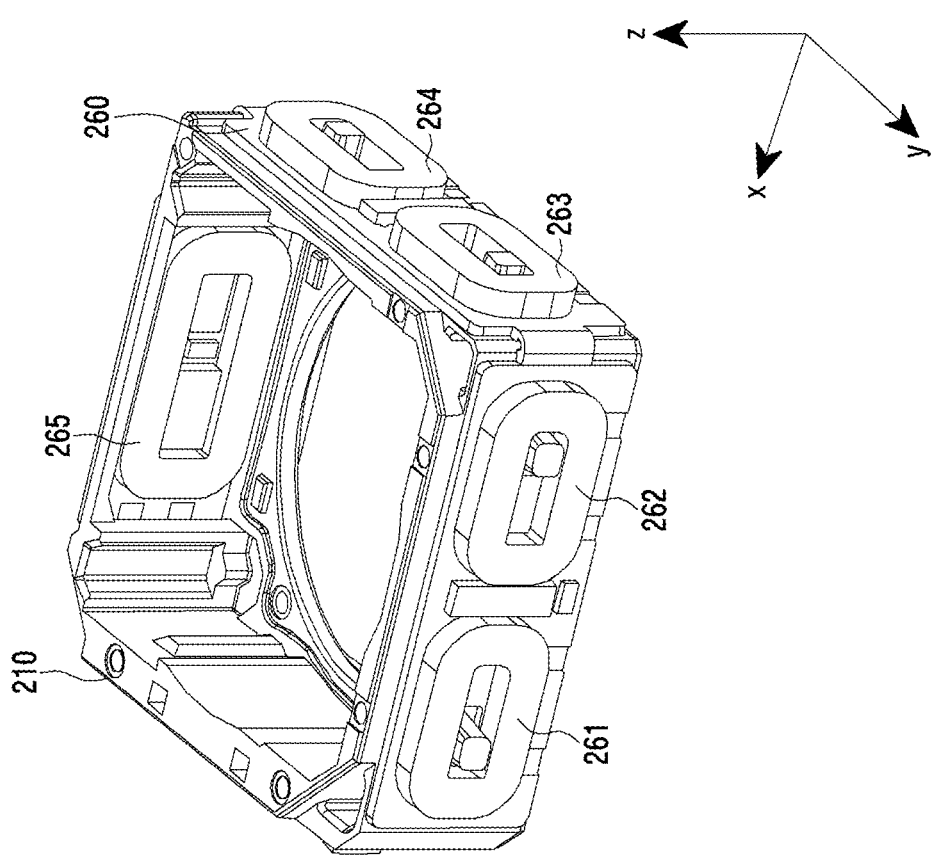

FIGS. 13A and 13B are perspective views illustrating a printed circuit board 260 and an OIS carrier 210 on which the printed circuit board 260 is disposed according to various embodiments.

The OIS carrier 110 and at least one OIS coil (e.g., a first OIS coil 261) of FIG. 13 may be referred by the OIS carrier 110 and the at least one OIS coil of FIGS. 1 to 12. The same terms or the same reference numerals are used for the same or substantially the same components as those described above, and redundant information may not be repeated.

According to an embodiment, the at least one coil may be disposed on the printed circuit board 260. For example, referring to FIG. 13, the printed circuit board 260 may include the first OIS coil 261, a second OIS coil 262, a third OIS coil 263, a fourth OIS coil 264, and an AF coil 265. However, a construction of the printed circuit board 260 is not limited thereto. For example, the printed circuit board 260 may further include at least one coil, or may omit at least one of the aforementioned coils. According to an embodiment, the first OIS coil 261, the second OIS coil 262, the third OIS coil 263, and the fourth OIS coil 264 may be disposed on an outer surface of the printed circuit board 260, and the AF coil 265 may be disposed on an inner surface of the printed circuit board 260.

According to an embodiment, the first OIS coil 261 and the second OIS coil 262 may be fixed to the portion of the printed circuit board 260 corresponding to a first side surface of the OIS carrier 210. In an example, the first OIS coil 261 may be disposed parallel to the second OIS coil 262 (e.g., in an X-axis direction). However, the disclosure is not limited thereto.

According to an embodiment, the third OIS coil 263 and the fourth OIS coil 264 may be fixed on the portion of the printed circuit board 260 corresponding to a second side surface substantially perpendicular to the first side surface of the OIS carrier 210. According to an embodiment, the third OIS coil 263 may be disposed parallel to the fourth OIS coil 264 (e.g., in a Y-axis direction). However, the disclosure is not limited thereto.

Figure 14:
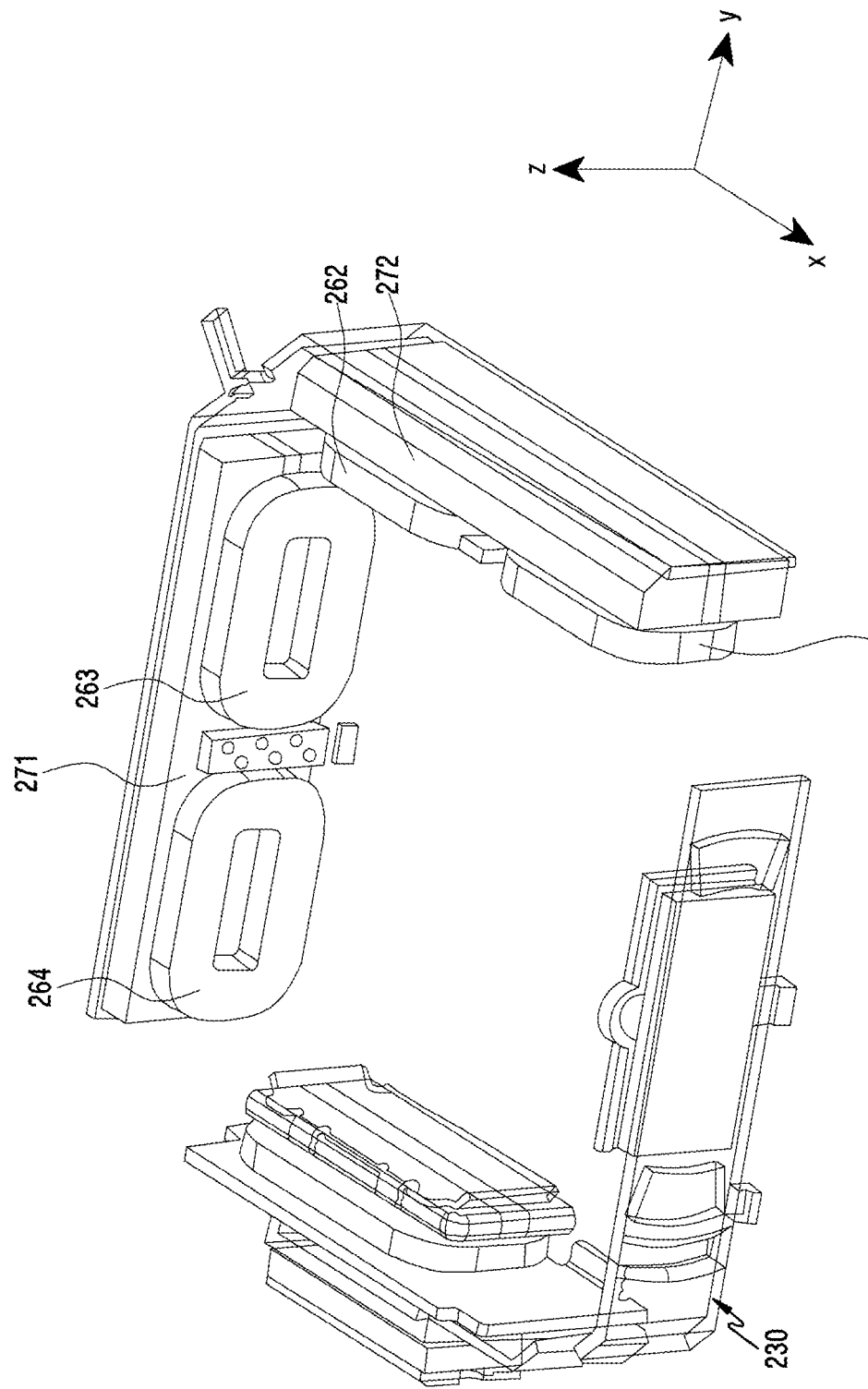
FIG. 14 is a perspective view illustrating positions of an OIS coil, an OIS magnet, and a frame in a camera module according to various embodiments.

FIG. 14 is a perspective view illustrating the positions of the OIS coils 261, 262, 263, and 264, the OIS magnets 271 and 272, and the frame 230 in the camera module according to various embodiments.

A construction of the camera module of FIG. 14 may be referred by the construction of the camera module (e.g., the camera module 100 of FIG. 1) of FIGS. 1 to 13. The same terms or the same reference numerals are used for the same as or substantially the same components as those described above, and redundant descriptions may not be repeated.

Referring to FIG. 14, the OIS magnet for hand-shake correction (e.g., optical image stabilizer (OIS)) disposed in a housing of an embodiment may be operated in a pair with a coil disposed in the OIS carrier and related to hand-shake correction. In an embodiment, when a current is applied to the first OIS coil 261 and/or the second OIS coil 262, the OIS carrier including a lens assembly (e.g., the lens assembly 101 of FIG. 6) may rotate in a direction (e.g., X-axis direction) substantially perpendicular to an optical axis as an axis, by an electromagnetic interaction between the first OIS coil 261 and/or the second OIS coil 262 and the first OIS magnet 272. In an embodiment, when a current is applied to the third OIS coil 263 and/or the fourth OIS coil 264, the OIS carrier including the lens assembly may rotate in another direction (e.g., Y-axis direction) substantially perpendicular to the optical axis as an axis, by an electromagnetic interaction between the third OIS coil 263 and/or the fourth OIS coil 264 and the second OIS magnet 271.

Figure 15:
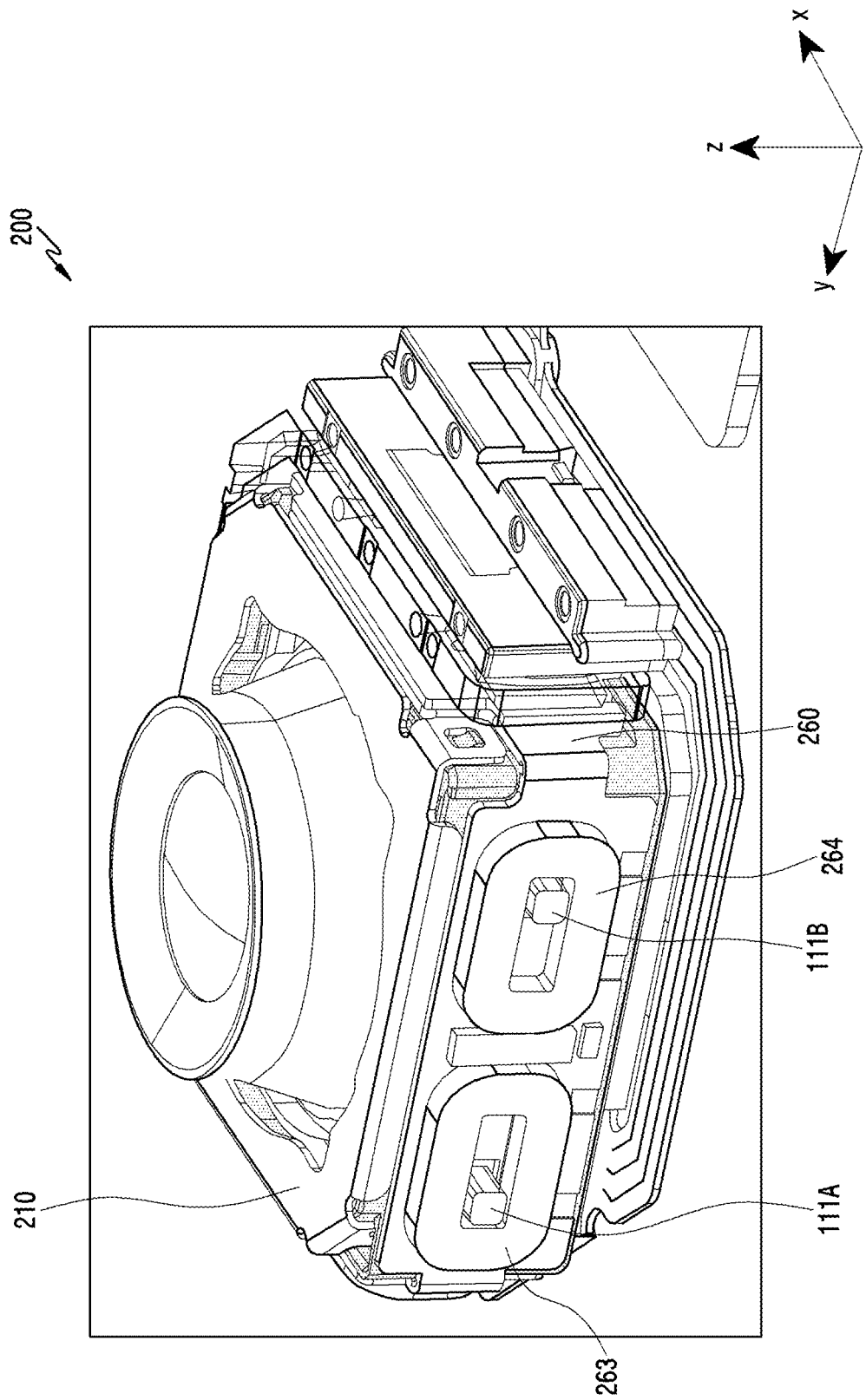
FIG. 15 is a perspective view illustrating a camera module according to various embodiments.

FIG. 15 is a perspective view illustrating a camera module 200 according to various embodiments.

A printed circuit board 260 of FIG. 15 may be referred by the printed circuit board 260 of FIG. 14. The camera module 200 of FIG. 15 may be referred by the camera module 100 of FIGS. 1 to 13. The same reference numerals are used for the same components as those described above, and redundant descriptions may not be repeated.

Referring to FIG. 15, a first side surface (e.g., the first side surface 111 of FIG. 1) of an OIS carrier 210 of an embodiment may include at least one protrusion protruding in a direction of being toward at least one OIS coil. For example, the first side surface of the OIS carrier 210 may include at least one first protrusion 111A protruding in a direction of being toward a third OIS coil 263. In an embodiment, the number of at least one protrusion may correspond to the number of at least one OIS coil. For example, referring to FIG. 15, when the camera module 200 includes a fourth OIS coil 264 disposed parallel to the third OIS coil 263, the first side surface may further include at least one second protrusion 111B. However, the disclosure is not limited thereto.

According to an embodiment, the OIS coil may be fixed to the OIS carrier by at least one protrusion. For example, referring to FIG. 15, the third OIS coil 263 may be fixed by the first protrusion 111A, and the fourth OIS coil 264 may be fixed by the second protrusion 111B.

According to an embodiment, although not shown in FIG. 15, a second side surface (e.g., the second side surface 112 of FIG. 1) of the OIS carrier 210 may include at least one third protrusion protruding in a direction of being toward a first OIS coil. For example, referring to FIG. 14, when the camera module 200 includes the second OIS coil 262 disposed parallel to the first OIS coil 261, the second side surface may further include at least one fourth protrusion. However, the disclosure is not limited thereto. According to an embodiment, although not shown in FIG. 15, at least one OIS coil may be fixed to the OIS carrier 210 by at least one protrusion formed on the second side surface of the OIS carrier 210.

Figure 16:
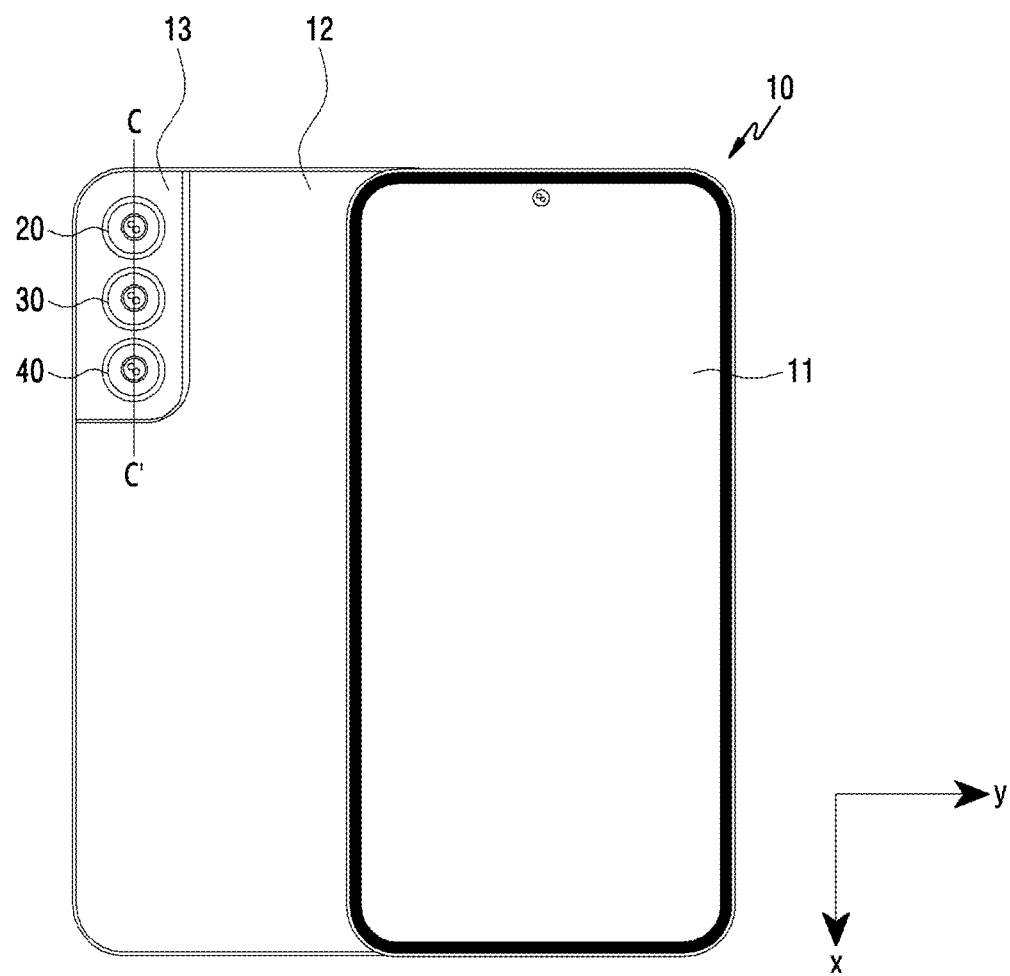
FIG. 16 is a diagram illustrating a plan view illustrating a front surface and a rear surface of an electronic device including a camera module according to various embodiments.
Figure 17:
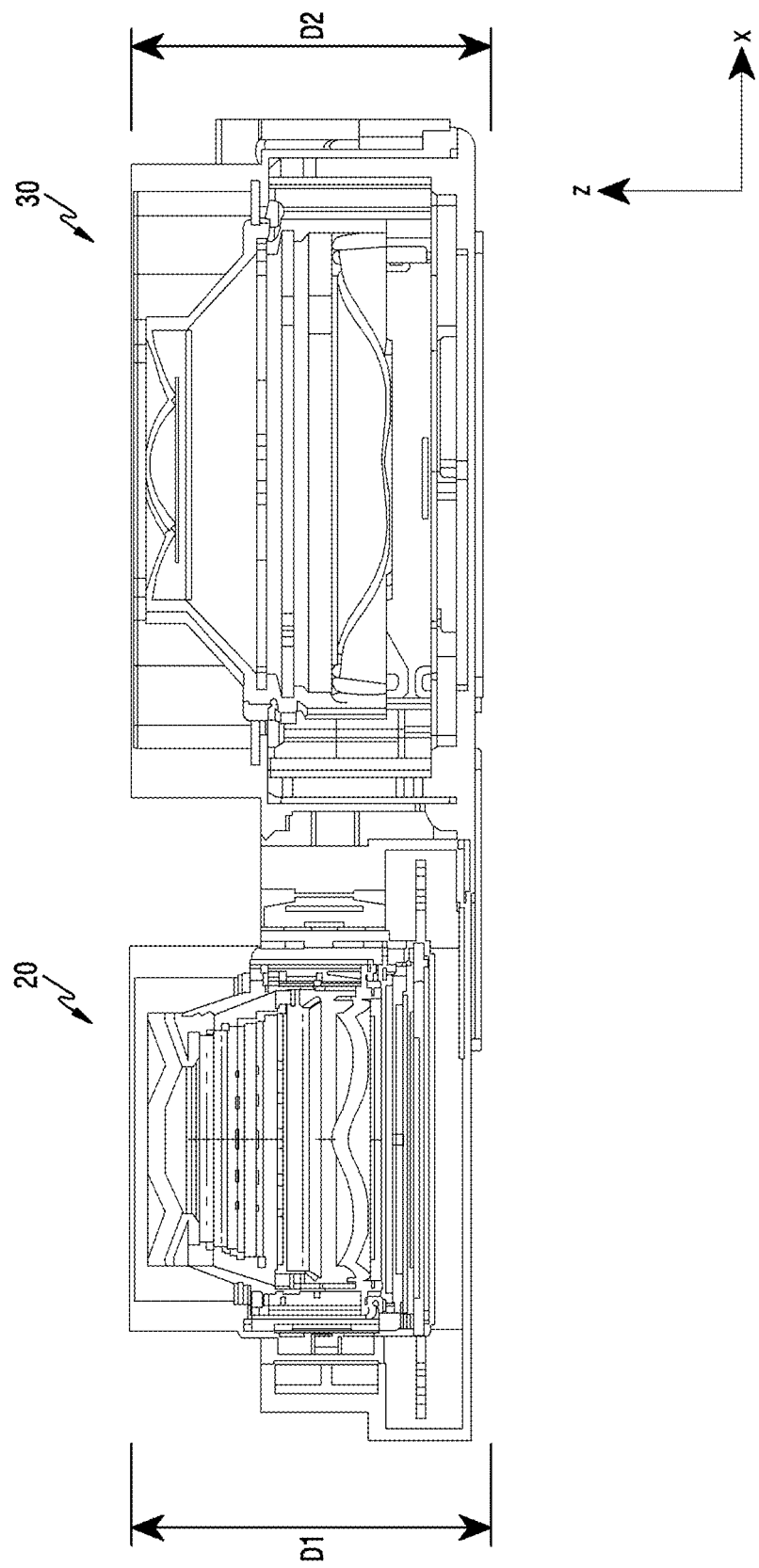
FIG. 17 is a cross-sectional view of the diagram of FIG. 16 taken along line C-C' according to various embodiments.
Figure 18:
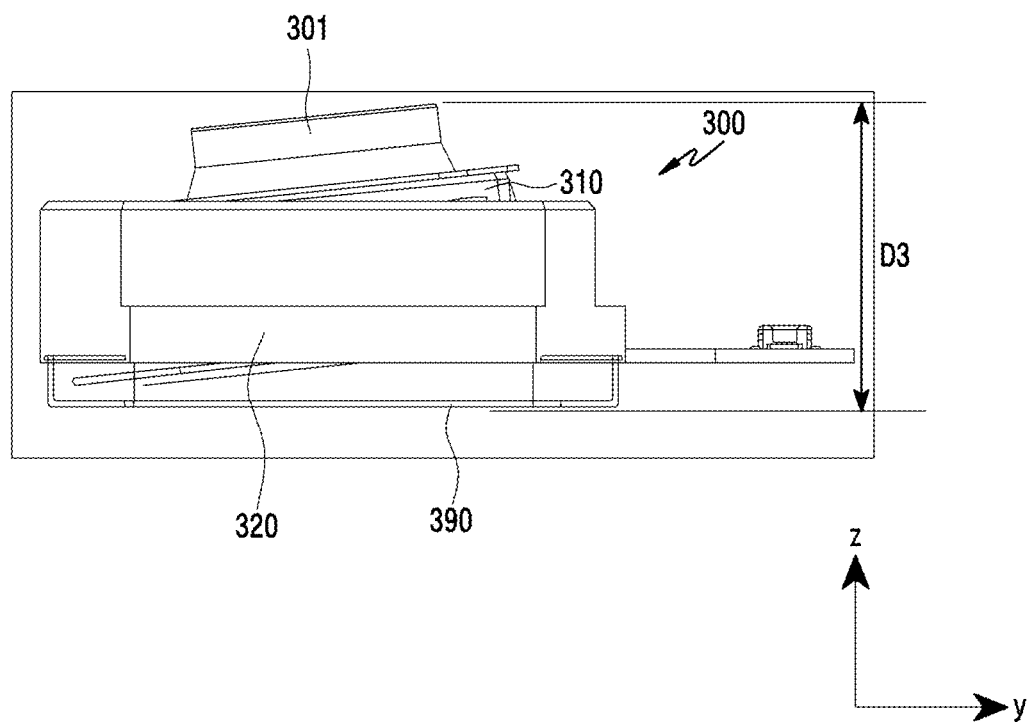
FIG. 18 is a diagram illustrating a plan view illustrating a height of a camera module according to various embodiments.

FIG. 16 is a diagram illustrating a plan view illustrating front and rear surfaces of an electronic device 10 including a camera module according to various embodiments. FIG. 17 is a cross-sectional view of the diagram of FIG. 16 taken along line C-C' according to various embodiments. FIG. 18 is a diagram illustrating a plan view illustrating a height of the camera module according to various embodiments.

The camera modules of FIGS. 16, 17 and 18 may be referred by the camera modules 100 and 200 of FIGS. 1 to 15. The same terms or the same reference numerals are used for the same or substantially the same components as those described above, and redundant descriptions may not be repeated.

According to an embodiment, the electronic device 10 may include at least one camera module. For example, the at least one camera module may be disposed on the rear surface of the electronic device 10 so as to face a rear of the electronic device 10. According to an embodiment, the electronic device 10 may include a first camera module 20, a second camera module 30, and a third camera module 40. In FIG. 16, it is illustrated that the electronic device 10 includes three camera modules, but the number of camera modules included in the electronic device 10 is not limited thereto.

The first camera module 20 of FIG. 16 may be referred by the camera modules 100 and 200 of FIGS. 1 to 15. According to an embodiment, the first camera module 20 may be an ultra-wide camera, the second camera module 30 may be a wide camera, and the third camera module 40 may be a tele camera. For example, the third camera module 40 may be a 3× zoom camera. According to an embodiment, the electronic device 10 may further include a distance sensor. However, the type or number of camera modules shown in FIG. 16 is only an example and does not limit the scope of the present disclosure. According to an embodiment, the camera module (e.g., the camera module 100 of FIG. 1) of the present disclosure may be applied to an ultra-wide-angle camera. However, the disclosure is not limited thereto.

According to an embodiment, a rear cover of the electronic device 10 may include at least one opening. For example, the rear cover of the electronic device 10 may include a first opening corresponding to the first camera module 20, a second opening corresponding to the second camera module 30, and a third opening corresponding to the third camera module 40. The rear cover of the electronic device 10 may further include an opening corresponding to the distance sensor.

According to an embodiment, the electronic device 10 may include a processor electrically connected to camera modules (e.g., the first camera module 20, the second camera module 30, and the third camera module 40). At least some of the operations described as being performed by the camera module in the present disclosure may be understood as being performed by the processor of the electronic device 10. Also, at least some of the operations described as being performed by the processor of the electronic device 10 in the present disclosure may be understood as being performed by the camera module.

Referring to FIG. 16, it is illustrated that the electronic device 10 includes three camera modules, but this is an example and does not limit the scope of the present disclosure. For example, embodiments of the present disclosure may be also applied to an electronic device including one camera module, and various embodiments of the present disclosure may be applied to an electronic device including a plurality of camera modules, and various embodiments of the present disclosure may be applied to some or all of the camera modules included in the electronic device.

According to an embodiment, the electronic device 10 may include a display 11 facing a front of the electronic device 10 (e.g., facing a −z direction) and a rear plate 12 facing a rear of the electronic device 10 (e.g., facing a +z direction). The electronic device 10 may include a cover 13 covering at least a portion of the camera modules (e.g., the first camera module 20, the second camera module 30, and the third camera module 40). In an example, the cover 13 may include, but is not limited to, glass. The cover 13 may be disposed on the rear plate 12 of the electronic device 10.

According to an embodiment, the height (e.g., thickness in the z-direction) from the display 11 to the cover 13 may be greater than, or substantially equal to, the height (e.g., thickness in the z-direction) from the display 11 to the back plate 12. However, the disclosure is not limited to this.

Referring to FIG. 16 and FIG. 17, the electronic device of an embodiment may include a plate on which at least one of the first camera module 20, the second camera module 30, and the third camera module is disposed.

According to an embodiment, the first camera module 20 may have a first height (D1). For example, the first camera module 20 may have a first height D1 from a reference position (e.g., the plate, the display 11, the rear plate 12 or the cover 13). The second camera module 30 may have a second height (D2). For example, the second camera module 30 may have a second height D2 from the reference position (e.g., the plate, the display 11, the rear plate 12 or the cover 13). According to an embodiment, the first height (D1) may be smaller than the second height (D2). In an example, the camera module (e.g., the camera module 100 of FIG. 1) of the present disclosure may be applied to an ultra-wide camera, thereby preventing and/or reducing at least one camera module from protruding compared to other camera modules.

Referring to FIG. 18, when an OIS carrier 310 including a lens assembly 301 of an embodiment rotates (or moves), the OIS carrier 310 may be tilted by forming a certain angle with respect to a housing 320. As the OIS carrier 310 is tilted, a first camera module 300 may have a third height (D3) greater than a first height (e.g., the first height (D1) of FIG. 17). For example, referring to FIG. 16, FIG. 17 and FIG. 18, the first camera module 300 may have a third height D3 that is greater than the first height from the reference position (e.g., the plate 390, the display 11, the rear plate 12 or the cover 13).

According to an embodiment, when the height of the first camera module 300 increases as the OIS carrier 310 is tilted (for example, when the first camera module 300 has the third height (D3)), the height (e.g., the third height (D3)) of the first camera module 300 may be lower than or substantially equal to the heights of other camera modules. For example, the electronic device may control the first camera module 300 wherein the third height (D3) of the first camera module 300 is substantially equal to or smaller than a second height (D2) of a second camera module (e.g., the second camera module 30 of FIG. 17). However, the disclosure is not limited thereto.

Referring to FIG. 16, FIG. 17 and FIG. 18, according to an embodiment, the height of the camera module (e.g., first height (D1), second height (D2), or third height (D3 in FIG. 18)) may be less than, or substantially equal to, the height of the electronic device (e.g., electronic device 10 in FIG. 16) (e.g., thickness in the z-direction of the electronic device).

Figure 19:
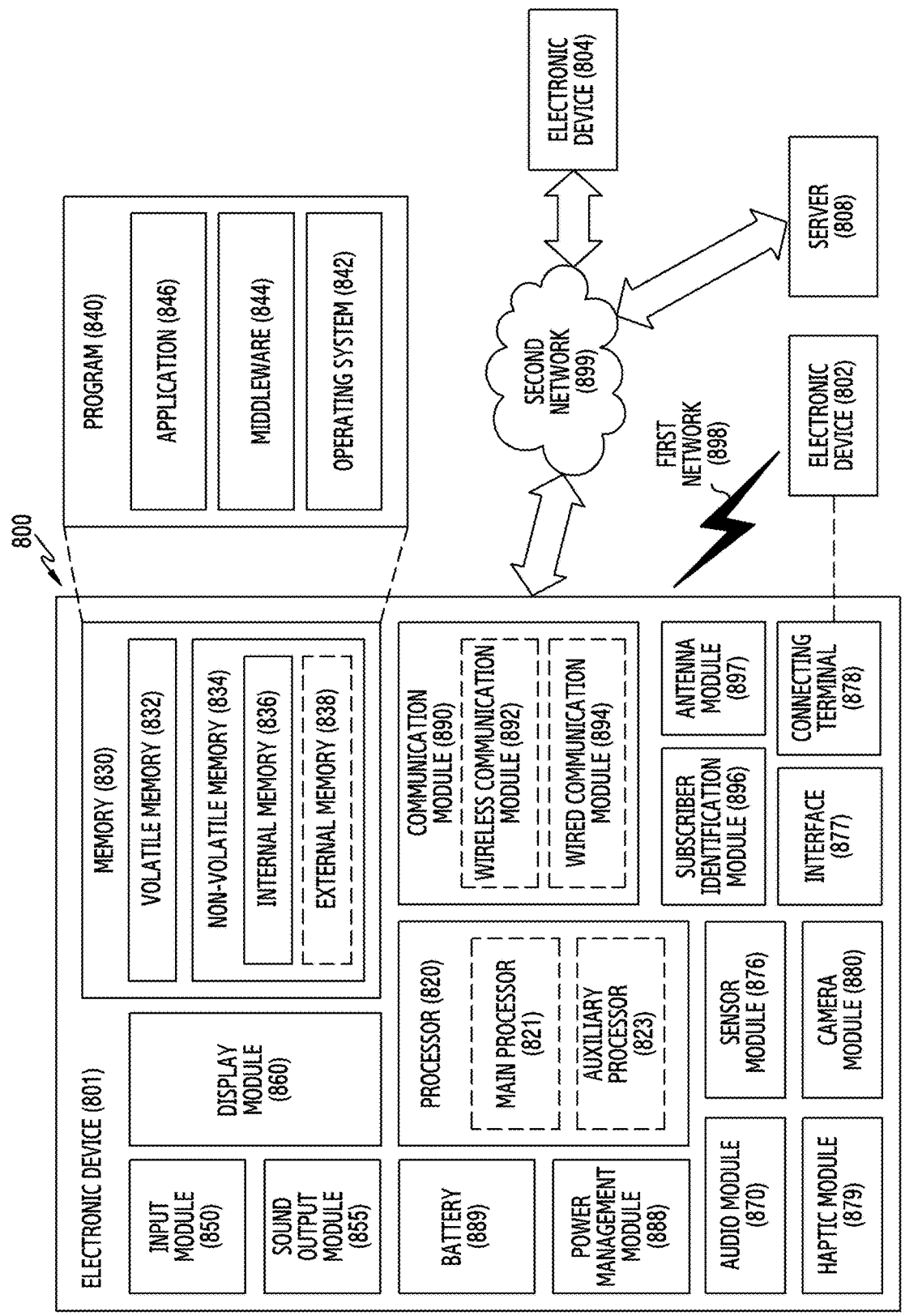
FIG. 19 is a block diagram illustrating an example electronic device in a network environment according to various embodiments.

FIG. 19 is a block diagram illustrating an example electronic device 801 within a network environment 800 according to various embodiments. Referring to FIG. 19, in the network environment 800, the electronic device 801 may communicate with an electronic device 802 through a first network 898 (e.g., a short-distance wireless communication network), or communicate with at least one of an electronic device 804 or a server 808 through a second network 899 (e.g., a long-distance wireless communication network). According to an embodiment, the electronic device 801 may communicate with the electronic device 804 through the server 808. According to an embodiment, the electronic device 801 may include a processor 820, a memory 830, an input module 850, an audio output module 855, a display module 860, an audio module 870, a sensor module 876, an interface 877, a connection terminal 878, a haptic module 879, a camera module 880, a power management module 888, a battery 889, a communication module 890, a subscriber identification module (SIM) 896, or an antenna module 897. In various embodiments, in the electronic device 801, at least one (e.g., the connection terminal 878) of these components may be omitted, or one or more other components may be added. In various embodiments, some (e.g., the sensor module 876, the camera module 880, or the antenna module 897) of these components may be integrated into a single component (e.g., the display module 860).

The processor 820, for example, may execute software (e.g., the program 840) and control at least one other component (e.g., hardware or software component) of the electronic device 801 connected to the processor 820, and perform various data processing or operations. According to an embodiment, the processor 820 may store, as at least part of data processing or operation, command or data received from other components (e.g., the sensor module 876 or the communication module 890) in a volatile memory 832, and process the command or data stored in the volatile memory 832, and store the resulting data in a non-volatile memory 834. According to an embodiment, the processor 820 may include a main processor 821 (e.g., a central processing unit or an application processor), or an auxiliary processor 823 (e.g., a graphic processing unit, a neural processing unit (NPU), an image signal processor, a sensor hub processor, or a communication processor) operable independently from or together with this. For example, when the electronic device 801 includes the main processor 821 and the auxiliary processor 823, the auxiliary processor 823 may use less power than the main processor 821, or be set to be specialized for a specified function. The auxiliary processor 823 may be implemented separately from or as a part of the main processor 821.

The auxiliary processor 823 may, for example, control at least some of functions or states related to at least one (e.g., the display module 860, the sensor module 876, or the communication module 890) of the components of the electronic device 801, instead of the main processor 821 while the main processor 821 is in an inactive (e.g., sleep) state, or together with the main processor 821 while the main processor 821 is in an active (e.g., application running) state. According to an embodiment, the auxiliary processor 823 (e.g., an image signal processor or a communication processor) may be implemented as some of other functionally related components (e.g., the camera module 880 or the communication module 890). According to an embodiment, the auxiliary processor 823 (e.g., a neural processing device) may include a hardware structure specialized for processing an artificial intelligence model. The AI model may be provided through machine learning. Such learning may be performed, for example, in the electronic device 801 itself where the artificial intelligence model is performed, or may be performed through a separate server (e.g., the server 808). A learning algorithm may include, for example, supervised learning, unsupervised learning, semi-supervised learning, or reinforcement learning, but is not limited to the above-described example. The artificial intelligence model may include a plurality of artificial neural network layers. An artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-network or a combination of two or more of the above, but is not limited to the above example. The artificial intelligence model may include, additionally or alternatively, a software structure in addition to a hardware structure.

The memory 830 may store various data used by at least one component (e.g., the processor 820 or the sensor module 876) of the electronic device 801. The data may include, for example, software (e.g., the program 840), and input data or output data for a command related thereto. The memory 830 may include the volatile memory 832 or the non-volatile memory 834.

The program 840 may be stored as software in the memory 830, and may include, for example, an operating system 842, middleware 844, or an application 846.

The input module 850 may receive a command or data to be used by the component (e.g., the processor 820) of the electronic device 801 from the outside (e.g., a user) of the electronic device 801. The input module 850 may include, for example, a microphone, a mouse, a keyboard, a key (e.g., a button), or a digital pen (e.g., a stylus pen).

The sound output module 855 may output sound signals to the outside of the electronic device 801. The sound output module 855 may include, for example, a speaker or a receiver. The speaker may be used for general purposes such as multimedia playback or record playback. The receiver may be used to receive an incoming call. According to an embodiment, the receiver may be implemented separately from or as a part of the speaker.

The display module 860 may visually present information to the outside (e.g., a user) of the electronic device 801. The display module 860 may include, for example, a display, a hologram device, or a projector and a control circuit for controlling the corresponding device. According to an embodiment, the display module 860 may include a touch sensor configured to detect a touch, or a pressure sensor configured to measure the strength of force provided by a touch.

The audio module 870 may convert a sound into an electrical signal or vice versa. According to an embodiment, the audio module 870 may acquire a sound through the input module 850, or output a sound through the sound output module 855, or an external electronic device (e.g., the electronic device 802) (e.g., a speaker or a headphone) connected directly or wirelessly to the electronic device 801.

The sensor module 876 may detect an operating state (e.g., power or temperature) of the electronic device 801 or an external environmental state (e.g., a user state), and provide an electrical signal or data value corresponding to the detected state. According to an embodiment, the sensor module 876 may include, for example, a gesture sensor, a gyro sensor, an air pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 877 may support one or more specified protocols that may be used to directly or wirelessly connect the electronic device 801 to the external electronic device (e.g., the electronic device 802). According to an embodiment, the interface 877 may include, for example, a high definition multimedia interface (HDMI), a universal serial bus (USB) interface, an SD card interface, or an audio interface.

The connection terminal 878 may include a connector through which the electronic device 801 may be physically connected to the external electronic device (e.g., the electronic device 802). According to an embodiment, the connection terminal 878 may include, for example, an HDMI connector, a USB connector, an SD card connector, or an audio connector (e.g., a headphone connector).

The haptic module 879 may convert an electrical signal into a mechanical stimulus (e.g., vibration or movement) or electrical stimulus that a user may perceive through a tactile or kinesthetic sense. According to an embodiment, the haptic module 879 may include, for example, a motor, a piezoelectric element, or an electrical stimulation device.

The camera module 880 may capture still images and moving images. According to an embodiment, the camera module 880 may include one or more lenses, image sensors, image signal processors, or flashes.

The power management module 888 may manage power supplied to the electronic device 801. According to an embodiment, the power management module 888 may be implemented as at least a part of a power management integrated circuit (PMIC), for example.

The battery 889 may supply power to at least one component of the electronic device 801. According to an embodiment, the battery 889 may include, for example, a non-rechargeable primary battery, a rechargeable secondary battery, or a fuel cell.

The communication module 890 may support the establishment of a direct (e.g., wired) communication channel or a wireless communication channel between the electronic device 801 and the external electronic device (e.g., the electronic device 802, the electronic device 804, or the server 808), and communication execution through the established communication channel. The communication module 890 may include one or more communication processors that operate independently of the processor 820 (e.g., an application processor) and support direct (e.g., wired) communication or wireless communication.

According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication module). Among these communication modules, the corresponding communication module may communicate with the external electronic device 804 through the first network 898 (e.g., a short-range communication network such as Bluetooth, wireless fidelity (WiFi) direct, or infrared data association (IrDA)) or the second network 899 (e.g., a long-range communication network such as a legacy cellular network, a 5G network, a next-generation communication network, the Internet, or a computer network (e.g., LAN or WAN)). These various types of communication modules may be integrated as one component (e.g., a single chip), or be implemented as a plurality of separate components (e.g., multiple chips). The wireless communication module 892 may identify or authenticate the electronic device 801 within a communication network such as the first network 898 or the second network 899, using subscriber information (e.g., international mobile subscriber identifier (IMSI)) stored in the subscriber identification module 896.

The wireless communication module 892 may support a beyond-4G-network 5G network and next-generation communication technology, for example, a new radio (NR) access technology. The NR access technology may support the high-speed transmission (enhanced mobile broadband (eMBB)) of high-capacity data, the minimization of terminal power and the access (massive machine type communications (mMTC)) of multiple terminals, or ultra-reliable and low-latency communications (URLLC). The wireless communication module 892 may support a high frequency band (e.g., mmWave band) in order to achieve a high data rate, for example. The wireless communication module 892 may support various technologies for securing performance in a high frequency band, for example, technologies such as beamforming, massive multiple-input and multiple-output (MIMO), full-dimensional MIMO (FD-MIMO), an array antenna, analog beam-forming, or a large scale antenna. The wireless communication module 892 may support various requirements defined for the electronic device 801, the external electronic device (e.g., the electronic device 804), or a network system (e.g., the second network 899). According to an embodiment, the wireless communication module 892 may support a peak data rate (e.g., 20 Gbps or more) for realizing eMBB, a loss coverage (e.g., 164 dB or less) for realizing mMTC, or a U-plane latency (e.g., each downlink (DL) and uplink (UL) of 0.5 ms or less, or round trip of 1 ms or less) for realizing URLLC.

The antenna module 897 may transmit or receive signals or power from the outside (e.g., the external electronic device). According to an embodiment, the antenna module 897 may include an antenna including a radiator that is formed of a conductor or conductive pattern formed on a substrate (e.g., PCB). According to an embodiment, the antenna module 897 may include a plurality of antennas (e.g., an array antenna). In this case, at least one antenna suitable for a communication method used in a communication network such as the first network 898 or the second network 899 may be selected from a plurality of antennas by the communication module 890, for example. A signal or power may be transmitted or received between the communication module 890 and the external electronic device through the selected at least one antenna. According to various embodiments, in addition to the radiator, other parts (e.g., a radio frequency integrated circuit (RFIC)) may be additionally formed as a part of the antenna module 897.

According to various embodiments, the antenna module 897 may form a mmWave antenna module. According to an embodiment, the mmWave antenna module may include a printed circuit board, an RFIC disposed on or adjacent to a first surface (e.g., bottom surface) of the printed circuit board and capable of supporting a specified high frequency band (e.g., mmWave band), and a plurality of antennas (e.g., an array antenna) disposed on or adjacent to a second surface (e.g., a top surface or a side surface) of the printed circuit board and capable of transmitting or receiving signals of a specified high frequency band.

At least some of the components may be connected to each other through a communication method (e.g., a bus, general purpose input and output (GPIO), a serial peripheral interface (SPI), or a mobile industry processor interface (MIPI)) between peripheral devices, and exchange signals (e.g., commands or data) with each other.

According to an embodiment, a command or data may be transmitted or received between the electronic device 801 and the external electronic device 804 through the server 808 connected to the second network 899. Each of the external electronic devices 802 or 804 may be the same as or be different from the electronic device 801. According to an embodiment, all or some of operations executed in the electronic device 801 may be executed in one or more external electronic devices among the external electronic devices 802, 804, and 808. For example, when the electronic device 801 needs to perform certain functions or services automatically or in response to a request from a user or another device, the electronic device 801 may, instead of or in addition to executing the function or service itself, request one or more external electronic devices to perform at least some of the functions or services. The one or more external electronic devices receiving the request may execute at least some of the requested functions or services or an additional function or service related to the request, and deliver the execution result to the electronic device 801. The electronic device 801 may present the result as at least a part of a response to the request as it is or by additional processing. To this end, for example, cloud computing, distributed computing, mobile edge computing (MEC), or client-server computing technology may be used. The electronic device 801 may, for example, present an ultra-low latency service using distributed computing or mobile edge computing. In an embodiment, the external electronic device 804 may include an Internet of things (IoT) device. The server 808 may be an intelligent server that uses machine learning and/or neural network. According to an embodiment, the external electronic device 804 or the server 808 may be included in the second network 899. The electronic device 801 may be applied to intelligent services (e.g., smart home, smart city, smart car, or health care), based on a 5G communication technology and an IoT-related technology.

Electronic devices of various embodiments disclosed in the present disclosure may be various types of devices. The electronic device may include, for example, a portable communication device (e.g., a smart phone), a computer device, a portable multimedia device, a portable medical device, a camera, a wearable device, a home appliance, or the like. The electronic device of an embodiment of the present disclosure is not limited to the aforementioned devices.

Various embodiments of the present disclosure and terms used therein are not intended to limit the technical features described in the present disclosure to specific embodiments, and should be understood to include various modifications, equivalents, or alternatives of the various embodiments. In connection with the description of the drawings, like reference numbers may be used for like or related elements. The singular form of a noun corresponding to an item may include one item or a plurality of items, unless relevant context clearly dictates otherwise. In the present disclosure, each of phrases such as "A or B", "at least one of A and B", "at least one of A or B", "A, B or C", "at least one of A, B and C", and "at least one of A, B, or C" may include any one of the items listed together in a corresponding phrase among the phrases, or all possible combinations thereof. Terms such as "first", "second", or "primary" or "secondary" may simply be used to distinguish a corresponding component from other corresponding components, and do not limit corresponding components in other respects (e.g., importance or order). When it is mentioned that some (e.g., first) component is "coupled" or "connected" to another (e.g., second) component, with or without the terms "functionally" or "communicatively", some component may be connected to another component directly (e.g., by wire), wirelessly, or through a third component.

The term "module" used in various embodiments of the present disclosure may include a unit implemented in hardware, software, or firmware, or any combination thereof, and may be used interchangeably with terms such as logic, logic blocks, parts, or circuits, for example. A module may be integrally constructed parts, or a minimal unit of parts performing one or more functions or a part thereof. For example, according to an embodiment, the module may be implemented in the form of an application-specific integrated circuit (ASIC).

Various embodiments of the present disclosure may be implemented as software (e.g., the program 840) including one or more instructions stored in a storage medium (e.g., an internal memory 836 or an external memory 838) readable by a machine (e.g., electronic device 801). For example, a processor (e.g., the processor 820) of the machine (e.g., the electronic device 801) may call at least one instruction among the stored one or more instructions from the storage medium, and execute it. This enables the machine to be operated to perform at least one function in accordance with the called at least one instruction. The one or more instructions may include a code provided by a compiler or a code executable by an interpreter. The machine-readable storage medium may be presented in the form of a non-transitory storage medium. Here, the 'non-transitory' storage medium is a tangible device and a signal (e.g., electromagnetic wave) is not included, and this term does not distinguish a case where data is stored semi-permanently in the storage medium and a case where it is stored temporarily.

According to an embodiment, a method of various embodiments disclosed in the present disclosure may be included and presented in a computer program product. The computer program product may be traded as a commodity between a seller and a buyer. The computer program product may be distributed in the form of a machine-readable storage medium (e.g., compact disc read only memory (CD-ROM)), or be distributed (e.g., downloaded or uploaded) through an application store (e.g., Play Store™) or directly or online between two user devices (e.g., smart phones). In the case of the online distribution, at least a part of the computer program product may be temporarily stored in a machine-readable storage medium such as a memory of a manufacturer's server, an application store's server, or a relay server, or be temporarily provided.

According to various embodiments, each component (e.g., module or program) of the described components may include a single entity or a plurality of entities, and some of the plurality of entities may be also separately disposed in other components. According to various embodiments, one or more components or operations among the aforementioned components may be omitted, or one or more other components or operations may be added. Alternatively or additionally, the plurality of components (e.g., modules or programs) may be integrated into a single component. In this case, the integrated component may perform one or more functions of each of the plurality of components identically or similarly to those performed by the corresponding component among the plurality of components prior to integration. According to various embodiments, operations performed by a module, program, or other components may be executed sequentially, in parallel, iteratively, or heuristically, or one or more of the operations may be executed in a different order, or be omitted, or one or more other operations may be added.

Figure 20:
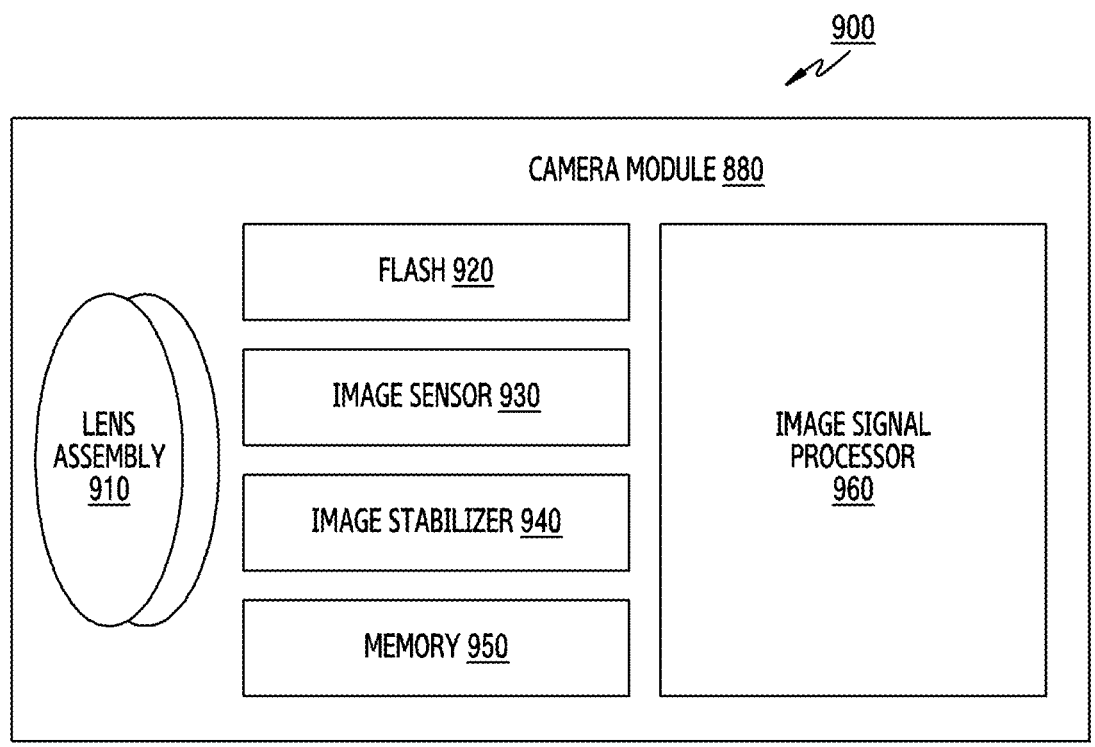
FIG. 20 is a block diagram illustrating an example configuration of a camera module according to various embodiments.

FIG. 20 is a block diagram 900 illustrating an example configuration of a camera module 880 according to various embodiments. Referring to FIG. 20, the camera module 880 may include a lens assembly 910, a flash 920, an image sensor 930, an image stabilizer 940, a memory 950 (e.g., a buffer memory), and/or an image signal processor (e.g., including processing circuitry) 960. The lens assembly 910 may collect light emitted from a subject that is an image capturing target. The lens assembly 910 may include one or more lenses. According to an embodiment, the camera module 880 may include a plurality of lens assemblies 910. In this case, the camera module 880 may form, for example, a dual camera, a 360-degree camera, or a spherical camera. Some of the plurality of lens assemblies 910 may have the same lens properties (e.g., angle of view, focal length, auto focus, f number, or optical zoom), or at least one lens assembly may have one or more lens properties different from the lens properties of other lens assemblies. The lens assembly 910 may include, for example, a wide-angle lens or a telephoto lens.

The flash 920 may emit light used to enhance light emitted or reflected from a subject. According to an embodiment, the flash 920 may include one or more light emitting diodes (e.g., a red-green-blue (RGB) LED, a white LED, an infrared LED, or an ultraviolet LED), or a xenon lamp. The image sensor 930 may acquire an image corresponding to the subject, by converting light emitted or reflected from the subject and transmitted through the lens assembly 910 into an electrical signal. According to an embodiment, the image sensor 930 may include, for example, one image sensor selected from among image sensors having different properties such as an RGB sensor, a black and white (BW) sensor, an IR sensor or a UV sensor, a plurality of image sensors having the same property, or a plurality of image sensors having different properties. Each image sensor included in the image sensor 930 may be implemented using, for example, and without limitation, a charged coupled device (CCD) sensor or a complementary metal oxide semiconductor (CMOS) sensor, or the like.

In response to the movement of the camera module 880 or the electronic device 801 including the same, the image stabilizer 940 may move at least one lens included in the lens assembly 910 or the image sensor 930 in a specific direction, and control operation characteristics of the image sensor 930 (e.g., adjust a read-out timing, etc.). This is to compensate at least part of negative effects of motion on an image being taken. According to an embodiment, the image stabilizer 940 may detect such a movement of the camera module 880 or the electronic device 801 using a gyro sensor (not shown) or an acceleration sensor (not shown) disposed inside or outside the camera module 880.

According to an embodiment, the image stabilizer 940 may be implemented as, for example, an optical image stabilizer. The memory 950 may at least temporarily store at least a part of an image acquired through the image sensor 930, for a next image processing task. For example, when image acquisition with a shutter is delayed or a plurality of images are acquired at high speed, the acquired original image (e.g., Bayer-patterned image or high-resolution image) may be stored in the memory 950, and a copy image (e.g., a low-resolution image) corresponding thereto may be previewed through the display module 860. Thereafter, when a specified condition is satisfied (e.g., a user input or a system command), at least a part of the original image stored in the memory 950 may be acquired and processed by, for example, the image signal processor 960. According to an embodiment, the memory 950 may be formed as at least a part of the memory 830 or as a separate memory operated independently of the memory 830.

The image signal processor 960 may include various processing circuitry and perform one or more image processing on an image acquired through the image sensor 930 or an image stored in the memory 950. The one or more image processing may include, for example, depth map provision, 3D modeling, panorama provision, feature point extraction, image synthesis, or image compensation (e.g., noise reduction, resolution adjustment, brightness adjustment, blurring, sharpening, or softening). Additionally or alternatively, the image signal processor 960 may perform at least one (e.g., control (e.g., exposure time control, read-out timing control, etc.) of the image sensor 930 of the components included in the camera module 880. The image processed by the image signal processor 960 may be stored again in the memory 950 for further processing, or be presented to an external component (e.g., the memory 830, the display module 860, the electronic device 802, the electronic device 804, or the server 808) of the camera module 880. According to an embodiment, the image signal processor 960 may be configured as at least a part of the processor 820, or be configured as a separate processor that operates independently of the processor 820. When the image signal processor 960 may be configured as the processor separate from the processor 820, at least one image processed by the image signal processor 960 may be displayed through the display module 860 as it is or after additional image processing by the processor 820.

According to an embodiment, the electronic device 801 may include a plurality of camera modules 880 each having different properties or functions. In this case, for example, at least one of the plurality of camera modules 880 may be a wide-angle camera, and at least one other may be a telephoto camera. Similarly, at least one of the plurality of camera modules 880 may be a front camera, and at least one other may be a rear camera.

As described above, a camera module (e.g., the camera module 100 of FIG. 1) according to an example embodiment of the present disclosure may include: a lens assembly including at least one lens aligned along an optical axis, an image sensor configured to convert light received through the at least one lens into an electrical signal, an optical image stabilization (OIS) carrier configured to rotate the lens assembly and the image sensor, a housing accommodating the lens assembly, the image sensor and the OIS carrier, a first OIS coil disposed to a first side surface of the OIS carrier, a second OIS coil disposed to a second side surface of the OIS carrier different with the first side surface, a first OIS magnet disposed to face the first OIS coil, a second OIS magnet disposed to face the second OIS coil, a frame including a first portion disposed between a third side surface of the OIS carrier opposite the first side surface and the housing and including at least one first guide portion, and a second portion extending from the first portion and disposed between a fourth side surface of the OIS carrier opposite the second side surface and the housing, at least one first object disposed between the first portion and the third side surface, and configured to enable the movement of the OIS carrier, and at least one second object disposed between the second portion and the housing, and configured to enable the movement of the frame and the OIS carrier. The at least one first object may be configured to roll along the at least one first guide portion based on the OIS carrier rotating.

According to an example embodiment, the first portion may include at least one second guide portion facing the at least one first guide portion, based on an axis of rotation of the OIS carrier.

According to an example embodiment, the at least one second object may be disposed and configured to guide along the at least one third guide portion (e.g., inside of the at least one third guide portion) formed on one surface of the housing facing the second portion based on the OIS carrier rotating. As used herein, guided may refer to a movement, rotation, sliding, or rolling motion while being received in a work area. However, the disclosure is not limited to.

According to an example embodiment, the first portion may include at least one fourth guide portion facing the at least one third guide portion, based on an axis of rotation of the frame.

According to an example embodiment, the first portion of the frame may include at least one first magnet, and the second portion of the frame may include at least one second magnet. The third side surface may include at least one first yoke facing the at least one first magnet. An inner surface of the housing facing the second portion may include at least one second yoke facing the at least one second magnet.

According to an example embodiment, the third side surface may include at least one first protrusion protruding in a direction toward the first portion of the frame. The first portion of the frame may include at least one first accommodating portion accommodating the at least one first protrusion. The at least one first protrusion may be disposed and configured to move along the at least one first accommodating portion based on the OIS carrier rotating.

According to an example embodiment, an inner surface of the housing facing the second portion of the frame may include at least one second protrusion protruding in a direction of being toward the second portion of the frame. The second portion of the frame may include at least one second accommodating portion accommodating the at least one second protrusion. The at least one second protrusion may be disposed and configured to move along the at least one second accommodating portion as the OIS carrier rotates.

According to an example embodiment, the OIS carrier may include a printed circuit board surrounding at least a part of a side surface of the OIS carrier. The printed circuit board may include the first OIS coil and the second OIS coil disposed on an outer surface of the printed circuit board, and an auto-focus (AF) coil disposed on an inner surface of the printed circuit board facing the fourth side surface.

According to an example embodiment, the camera module may further include a driving circuit electrically connected to the first OIS coil and the second OIS coil. The driving circuit may be configured to move the OIS carrier on a plane perpendicular to the optical axis, by controlling a current applied to at least one of the first OIS coil or the second OIS coil.

According to an example embodiment, the first portion of the frame may include at least one first curved portion facing the housing.

According to an example embodiment, the second portion of the frame may include at least one second curved portion facing the fourth side surface of the OIS carrier.

According to an example embodiment, the first side surface of the OIS carrier may include at least one first protrusion protruding in a direction toward the first OIS coil. The second side surface of the OIS carrier may include at least one second protrusion protruding in a direction toward the second OIS coil. The first OIS coil may be fixed to the OIS carrier by the at least one first protrusion. The second OIS coil may be fixed to the OIS carrier by the at least one second protrusion.

According to an example embodiment, the camera module may include a third OIS coil disposed to the first side surface of the OIS carrier, and disposed parallel to the first OIS coil, and a fourth OIS coil disposed to the second side surface of the OIS carrier substantially perpendicular to the first side surface, and disposed parallel to the second OIS coil.

As described above, an electronic device according to an example embodiment of the present disclosure may include: a first camera module. The first camera module may include: a lens assembly comprising at least one lens aligned along an optical axis, an image sensor configured to convert light received through the at least one lens into an electrical signal, an optical image stabilization (OIS) carrier configured to rotate the lens assembly and the image sensor, a housing accommodating the lens assembly, the image sensor and the OIS carrier, a first OIS coil disposed to a first side surface of the OIS carrier, a second OIS coil disposed to a second side surface of the OIS carrier different with the first side surface, a first OIS magnet disposed to face the first OIS coil, a second OIS magnet disposed to face the second OIS coil, a frame including a first portion disposed between a third side surface of the OIS carrier opposite the first side surface and the housing and including at least one first guide portion, and a second portion extending from the first portion and disposed between a fourth side surface of the OIS carrier opposite the second side surface and the housing, at least one first object disposed between the first portion and the third side surface and configured to enable the movement of the OIS carrier, and at least one second object disposed between the second portion and the housing, and configured to enable the movement of the frame and the OIS carrier. The at least one first object may be configured to roll along the at least one first guide portion based on the OIS carrier rotating.

According to an example embodiment, the electronic device may further include at least one of a second camera module including a camera or a third camera module including a camera.

According to an example embodiment, the first camera module may have a first height, and the second camera module may have a second height greater than the first height. Based on the OIS carrier rotating based on an axis perpendicular to the optical axis, the first camera module may have a third height greater than the first height. The third height may be less than or substantially equal to the second height.

According to an example embodiment, the first portion may include at least one second guide portion facing the at least one first guide portion, based on an axis of rotation of the OIS carrier.

According to an example embodiment, the first portion of the frame may include at least one first magnet, and the second portion of the frame may include at least one second magnet. The third side surface may include at least one first yoke facing the at least one first magnet. An inner surface of the housing facing the second portion may include at least one second yoke facing the at least one second magnet.

According to an example embodiment, the first portion of the frame may include at least one first curved portion formed convexly on an outer surface facing the housing. The second portion of the frame may include at least one second curved portion formed convexly on an inner surface facing the fourth side surface of the OIS carrier.

According to an example embodiment, the third side surface may include at least one first protrusion protruding in a direction of being toward the first portion of the frame. The first portion of the frame may include at least one first accommodating portion accommodating the at least one first protrusion. The at least one first protrusion may be disposed and configured to move along the at least one first accommodating portion based on the OIS carrier rotating. An inner surface of the housing facing the second portion of the frame may include at least one second protrusion protruding in a direction of being toward the second portion of the frame. The second portion of the frame may include at least one second accommodating portion accommodating the at least one second protrusion. The at least one second protrusion may be disposed and configured to move along the at least one second accommodating portion based on the OIS carrier rotating.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

As described above, a camera module (e.g., the camera module 100 of FIG. 1) according to an example embodiment of the present disclosure may include: a lens assembly comprising at least one lens aligned along an optical axis, an image sensor configured to convert light received through the at least one lens into an electrical signal, an optical image stabilization (OIS) carrier configured to tilt the lens assembly and the image sensor, a housing accommodating the lens assembly, the image sensor and the OIS carrier, a first OIS coil disposed to a first side of the OIS carrier, a second OIS coil disposed to a second side of the OIS carrier different with the first side, a first OIS magnet disposed to face the first OIS coil, a second OIS magnet disposed to face the second OIS coil, a frame comprising a first portion disposed between a third side of the OIS carrier opposite the first side and the housing and including at least one first guide portion, and a second portion extending from the first portion and disposed between a fourth side of the OIS carrier opposite the second side and the housing, at least one first object movably disposed between the first portion and the third side, and configured to enable movement of the OIS carrier; and at least one second object movably disposed between the second portion and the housing, and configured to enable movement of the frame and the OIS carrier. The at least one first object is configured to move along the at least one first guide portion as the OIS carrier tilts.

According to an example embodiment, the first portion comprises at least one second guide portion opposite the at least one first guide portion with respect to a reference axis along which the OIS carrier tilts.

According to an example embodiment, the at least one second object is configured to move along the at least one third guide portion formed on one surface of the housing facing the second portion as the OIS carrier tilts.

According to an example embodiment, the second portion comprises at least one fourth guide portion opposite the at least one third guide portion with respect to a reference axis along which the frame and the OIS carrier tilt.

According to an example embodiment, the first portion of the frame comprises at least one first magnet, and the second portion of the frame comprises at least one second magnet. The third side comprises at least one first yoke facing the at least one first magnet. An inner side of the housing facing the second portion comprises at least one second yoke facing the at least one second magnet.

According to an example embodiment, the third side comprises at least one first protrusion protruding in a direction toward the first portion of the frame. the first portion of the frame comprises at least one first accommodating portion accommodating the at least one first protrusion. the at least one first protrusion is disposed and configured to move along the at least one first accommodating portion as the OIS carrier tilts.

According to an example embodiment, an inner side of the housing facing the second portion of the frame comprises at least one second protrusion protruding in a direction toward the second portion of the frame. the second portion of the frame comprises at least one second accommodating portion accommodating the at least one second protrusion. the at least one second protrusion is disposed and configured to move along the at least one second accommodating portion as the OIS carrier tilts.

According to an example embodiment, the OIS carrier comprises a printed circuit board surrounding at least a part of at least one side of the OIS carrier. the printed circuit board comprises the first OIS coil and the second OIS coil disposed on an outer side of the printed circuit board, and an auto-focus (AF) coil disposed on an inner side of the printed circuit board facing the fourth side.

According to an example embodiment, the camera module further comprises a driving circuit electrically connected to the first OIS coil and the second OIS coil. The driving circuit is configured to control the OIS carrier to move on a plane perpendicular to the optical axis, by controlling a current applied to at least one of the first OIS coil or the second OIS coil.

According to an example embodiment, the first portion of the frame comprises at least one first curved portion formed facing the housing.

According to an example embodiment, the second portion of the frame comprises at least one second curved portion facing the fourth side of the OIS carrier.

According to an example embodiment, the first side of the OIS carrier comprises at least one first protrusion protruding in a direction toward the first OIS coil. The second side of the OIS carrier comprises at least one second protrusion protruding in a direction toward the second OIS coil. The first OIS coil is fixed to the OIS carrier by the at least one first protrusion. The second OIS coil is fixed to the OIS carrier by the at least one second protrusion According to an example embodiment, the camera module comprises a third OIS coil disposed to the first side of the OIS carrier, and disposed parallel to the first OIS coil, and a fourth OIS coil disposed to the second side of the OIS carrier substantially perpendicular to the first side, and disposed parallel to the second OIS coil.

As described above, an electronic device (e.g., the electronic device 10 of FIG. 16) according to an example embodiment of the present disclosure may comprise a camera module (e.g., the camera module 100 of FIG. 1). The first camera module comprises: a lens assembly comprising at least one lens aligned along an optical axis, an image sensor configured to convert light received through the at least one lens into an electrical signal, an optical image stabilization (OIS) carrier configured to tilt the lens assembly and the image sensor, a housing accommodating the lens assembly, the image sensor and the OIS carrier, a first OIS coil disposed to a first side of the OIS carrier, a second OIS coil disposed to a second side of the OIS carrier different with the first side, a first OIS magnet disposed to face the first OIS coil, a second OIS magnet disposed to face the second OIS coil, a frame comprising a first portion disposed between a third side of the OIS carrier opposite the first side and the housing and including at least one first guide portion, and a second portion extending from the first portion and disposed between a fourth side of the OIS carrier opposite the second side and the housing, at least one first object movably disposed between the first portion and the third side and configured to enable the movement of the OIS carrier; and at least one second object disposed between the second portion and the housing, and configured to enable the movement of the frame and the OIS carrier. The at least one first object movably is configured to move along the at least one first guide portion as the OIS carrier tilts.

According to an example embodiment, the electronic device further comprises at least one of a second camera module including a camera and/or a third camera module including a camera.

According to an example embodiment, the first camera module has a first height, and the second camera module has a second height greater than the first height. The first camera module has a third height greater than the first height, based on the OIS carrier tilting based on an axis perpendicular to the optical axis. The third height is less than or substantially equal to the second height.

According to an example embodiment, the first portion comprises at least one second guide portion opposite the at least one first guide portion with respect to a reference axis along which the OIS carrier tilts.

According to an example embodiment, the first portion of the frame comprises at least one first magnet, and the second portion of the frame comprises at least one second magnet. The third side comprises at least one first yoke facing the at least one first magnet. An inner side of the housing facing the second portion comprises at least one second yoke facing the at least one second magnet.

According to an example embodiment, the first portion of the frame comprises at least one first curved portion facing the housing. The second portion of the frame comprises at least one second curved portion facing the fourth side of the OIS carrier.

According to an example embodiment, the third side comprises at least one first protrusion protruding in a direction toward the first portion of the frame. The first portion of the frame comprises at least one first accommodating portion accommodating the at least one first protrusion. The at least one first protrusion is disposed and configured to move along the at least one first accommodating portion as the OIS carrier tilts. An inner side of the housing facing the second portion of the frame comprises at least one second protrusion protruding in a direction toward the second portion of the frame. The second portion of the frame comprises at least one second accommodating portion accommodating the at least one second protrusion. The at least one second protrusion is disposed and configured to move along the at least one second accommodating portion as the OIS carrier tilts.

What is claimed is:

1. A camera module comprising:
a lens assembly comprising at least one lens aligned along an optical axis;
an image sensor configured to convert light received through the at least one lens into an electrical signal;
an optical image stabilization (OIS) carrier configured to tilt the lens assembly and the image sensor;
a housing accommodating the lens assembly, the image sensor and the OIS carrier;
a first OIS coil disposed to a first side of the OIS carrier;
a second OIS coil disposed to a second side of the OIS carrier different with the first side;
a first OIS magnet disposed to face the first OIS coil;
a second OIS magnet disposed to face the second OIS coil;
a frame comprising a first portion disposed between a third side of the OIS carrier opposite the first side and the housing and including at least one first guide portion, and a second portion extending from the first portion and disposed between a fourth side of the OIS carrier opposite the second side and the housing;
at least one first object movably disposed between the first portion and the third side, and configured to enable movement of the OIS carrier; and
at least one second object movably disposed between the second portion and the housing, and configured to enable movement of the frame and the OIS carrier,
wherein the at least one first object is configured to move along the at least one first guide portion as the OIS carrier tilts.

2. The camera module of claim 1, wherein the first portion comprises at least one second guide portion opposite the at least one first guide portion with respect to a reference axis along which the OIS carrier tilts.

3. The camera module of claim 1, wherein the at least one second object is configured to move along an at least one third guide portion formed on one surface of the housing facing the second portion as the OIS carrier tilts.

4. The camera module of claim 3, wherein the second portion comprises at least one fourth guide portion opposite the at least one third guide portion with respect to a reference axis along which the frame and the OIS carrier tilt.

5. The camera module of claim 1, wherein the first portion of the frame comprises at least one first magnet, and the second portion of the frame comprises at least one second magnet,
wherein the third side comprises at least one first yoke facing the at least one first magnet, and
wherein an inner side of the housing facing the second portion comprises at least one second yoke facing the at least one second magnet.

6. The camera module of claim 1, wherein the third side comprises at least one first protrusion protruding in a direction toward the first portion of the frame,
wherein the first portion of the frame comprises at least one first accommodating portion accommodating the at least one first protrusion, and
wherein the at least one first protrusion is disposed and configured to move along the at least one first accommodating portion as the OIS carrier tilts.

7. The camera module of claim 1, wherein an inner side of the housing facing the second portion of the frame comprises at least one second protrusion protruding in a direction toward the second portion of the frame,
wherein the second portion of the frame comprises at least one second accommodating portion accommodating the at least one second protrusion, and
wherein the at least one second protrusion is disposed and configured to move along the at least one second accommodating portion as the OIS carrier tilts.

8. The camera module of claim 1, wherein the OIS carrier comprises a printed circuit board surrounding at least a part of at least one side of the OIS carrier, and
wherein the printed circuit board comprises the first OIS coil and the second OIS coil disposed on an outer side of the printed circuit board, and an auto-focus (AF) coil disposed on an inner side of the printed circuit board facing the fourth side.

9. The camera module of claim 1, further comprising a driving circuit electrically connected to the first OIS coil and the second OIS coil, and
wherein the driving circuit is configured to control the OIS carrier to move on a plane perpendicular to the optical axis, by controlling a current applied to at least one of the first OIS coil or the second OIS coil.

10. The camera module of claim 1, wherein the first portion of the frame comprises at least one first curved portion formed facing the housing.

11. The camera module of claim 1, wherein the second portion of the frame comprises at least one second curved portion facing the fourth side of the OIS carrier.

12. The camera module of claim 1, wherein the first side of the OIS carrier comprises at least one first protrusion protruding in a direction toward the first OIS coil,
wherein the second side of the OIS carrier comprises at least one second protrusion protruding in a direction toward the second OIS coil,
wherein the first OIS coil is fixed to the OIS carrier by the at least one first protrusion, and
wherein the second OIS coil is fixed to the OIS carrier by the at least one second protrusion.

13. The camera module of claim 1, comprising:
a third OIS coil disposed to the first side of the OIS carrier, and disposed parallel to the first OIS coil; and
a fourth OIS coil disposed to the second side of the OIS carrier substantially perpendicular to the first side, and disposed parallel to the second OIS coil.

14. An electronic device comprising a first camera module,
wherein the first camera module comprises:
a lens assembly comprising at least one lens aligned along an optical axis;
an image sensor configured to convert light received through the at least one lens into an electrical signal;
an optical image stabilization (OIS) carrier configured to tilt the lens assembly and the image sensor;
a housing accommodating the lens assembly, the image sensor and the OIS carrier;
a first OIS coil disposed to a first side of the OIS carrier;
a second OIS coil disposed to a second side of the OIS carrier different with the first side;
a first OIS magnet disposed to face the first OIS coil;
a second OIS magnet disposed to face the second OIS coil;
a frame comprising a first portion disposed between a third side of the OIS carrier opposite the first side and the housing and including at least one first guide portion, and a second portion extending from the first portion and disposed between a fourth side of the OIS carrier opposite the second side and the housing;
at least one first object movably disposed between the first portion and the third side and configured to enable the movement of the OIS carrier; and
at least one second object disposed between the second portion and the housing, and configured to enable the movement of the frame and the OIS carrier,
wherein the at least one first object movably is configured to move along the at least one first guide portion as the OIS carrier tilts.

15. The electronic device of claim 14, further comprising at least one of a second camera module including a camera and/or a third camera module including a camera.

16. The electronic device of claim 15, wherein the first camera module has a first height,
wherein the second camera module has a second height greater than the first height,
wherein the first camera module has a third height greater than the first height, based on the OIS carrier tilting based on an axis perpendicular to the optical axis, and
wherein the third height is less than or substantially equal to the second height.

17. The electronic device of claim 14, wherein the first portion comprises at least one second guide portion opposite the at least one first guide portion with respect to a reference axis along which the OIS carrier tilts.

18. The electronic device of claim 14, wherein the first portion of the frame comprises at least one first magnet, and the second portion of the frame comprises at least one second magnet,
wherein the third side comprises at least one first yoke facing the at least one first magnet, and
wherein an inner side of the housing facing the second portion comprises at least one second yoke facing the at least one second magnet.

19. The electronic device of claim 14, wherein the first portion of the frame comprises at least one first curved portion facing the housing, and
wherein the second portion of the frame comprises at least one second curved portion facing the fourth side of the OIS carrier.

20. The electronic device of claim 14, wherein the third side comprises at least one first protrusion protruding in a direction toward the first portion of the frame,
wherein the first portion of the frame comprises at least one first accommodating portion accommodating the at least one first protrusion,
wherein the at least one first protrusion is disposed and configured to move along the at least one first accommodating portion as the OIS carrier tilts,
wherein an inner side of the housing facing the second portion of the frame comprises at least one second protrusion protruding in a direction toward the second portion of the frame,
wherein the second portion of the frame comprises at least one second accommodating portion accommodating the at least one second protrusion, and
wherein the at least one second protrusion is disposed and configured to move along the at least one second accommodating portion as the OIS carrier tilts.

\* \* \* \* \*